US010869266B2

(12) United States Patent
Gupta et al.

(10) Patent No.: US 10,869,266 B2
(45) Date of Patent: Dec. 15, 2020

(54) ENERGY EFFICIENT DISCOVERY AND TRAFFIC MANAGEMENT IN A MESH WAN FOR IOES WITH A WAKEUP RECEIVER

(71) Applicant: QUALCOMM Incorporated, San Diego, CA (US)

(72) Inventors: Piyush Gupta, Bridgewater, NJ (US); Junyi Li, Chester, NJ (US); Hao Xu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 153 days.

(21) Appl. No.: 15/583,985

(22) Filed: May 1, 2017

(65) Prior Publication Data

US 2018/0139695 A1 May 17, 2018

Related U.S. Application Data

(60) Provisional application No. 62/420,909, filed on Nov. 11, 2016.

(51) Int. Cl.
*H04W 52/02* (2009.01)
*H04L 12/12* (2006.01)
(Continued)

(52) U.S. Cl.
CPC ........ *H04W 52/0203* (2013.01); *H04B 7/155* (2013.01); *H04L 12/12* (2013.01);
(Continued)

(58) Field of Classification Search
CPC . H04W 52/0203; H04W 48/10; H04W 52/02; H04W 48/16; H04W 56/0015;
(Continued)

(56) References Cited

U.S. PATENT DOCUMENTS 7,457,973 B2  11/2008  Liu
8,112,650 B2   2/2012  Qing et al.
(Continued)

FOREIGN PATENT DOCUMENTS

EP  2448181 A2  5/2012
EP  2566112 A1  3/2013
EP  3026943 A1  6/2016

OTHER PUBLICATIONS

International Search Report and Written Opinion—PCT/US2017/060426—ISA/EPO—dated Jan. 17, 2018.
(Continued)

*Primary Examiner* — Ricardo H Castaneyra
(74) *Attorney, Agent, or Firm* — Holland & Hart LLP

(57) ABSTRACT

A relay device in a mesh wireless access network (WAN) may listen for a signal during a pre-wakeup (PWU) period to determine whether to power on a radio during a wakeup cycle. If the relay device receives a signal during the PWU period, it may power on a radio to transmit a discovery broadcast or to send and receive data. The relay device may also receive synchronization signals during the PWU period to maintain timing synchronization in cases when the wakeup cycle includes long periods of inactivity. That is, different internet of everything (IoE) devices (including relay devices) may operate in different discovery modes based on different mobility patterns. Devices that move frequently may operate in a transient operating mode. Devices that rarely move may operate in a persistent operating mode, and may take advantage of the PWU synchronization signals.

38 Claims, 19 Drawing Sheets

(51) Int. Cl.
*H04B 7/155* (2006.01)
*H04L 29/08* (2006.01)
*H04W 48/10* (2009.01)
*H04W 56/00* (2009.01)
*H04W 48/16* (2009.01)

(52) U.S. Cl.
CPC ............. *H04L 67/12* (2013.01); *H04W 48/10* (2013.01); *H04W 56/0015* (2013.01); *H04W 48/16* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/20* (2018.01); *Y02D 70/21* (2018.01); *Y02D 70/22* (2018.01); *Y02D 70/24* (2018.01)

(58) Field of Classification Search
CPC ........ H04W 8/005; H04L 67/12; H04L 12/12; H04B 7/155; Y02D 70/00; Y02D 70/21; Y02D 70/146; Y02D 70/142; Y02D 70/24; Y02D 70/1264; Y02D 70/1262; Y02D 70/20; Y02D 70/22; Y02D 70/1242
See application file for complete search history.

(56) References Cited

U.S. PATENT DOCUMENTS

| | | | |
|---|---|---|---|
| 8,351,405 B2* | 1/2013 | Li | H04L 27/261 370/328 |
| 8,989,145 B2 | 3/2015 | Das et al. | |
| 2013/0259231 A1 | 10/2013 | Wang et al. | |
| 2014/0134993 A1* | 5/2014 | Kwak | H04W 52/0206 455/418 |
| 2015/0215866 A1* | 7/2015 | Kojima | H04W 52/0216 455/41.2 |
| 2015/0373626 A1* | 12/2015 | Yi | H04W 48/20 375/132 |
| 2016/0337877 A1* | 11/2016 | Sorrentino | H04W 72/04 |
| 2016/0338143 A1 | 11/2016 | Johansson et al. | |
| 2017/0048918 A1* | 2/2017 | Iwamura | H04W 52/0206 |
| 2018/0092034 A1* | 3/2018 | Huang | H04W 52/0229 |

OTHER PUBLICATIONS

Cheng H., et al., "An Adaptive Hybrid Dynamic Power Management Method for Handheld Devices", Proceedings of the IEEE International Conference on Sensor Networks, Ubiquitous and Trustworthy Computing, 2006, pp. 1-6.

* cited by examiner

ENERGY EFFICIENT DISCOVERY AND TRAFFIC MANAGEMENT IN A MESH WAN FOR IOES WITH A WAKEUP RECEIVER

CROSS REFERENCES

The present Application for Patent claims priority to U.S. Provisional Patent Application No. 62/420,909 by GUPTA, et al., entitled "Energy Efficient Discovery and Traffic Management in a Mesh WAN for IoEs With a Wakeup Receiver," filed Nov. 11, 2016, assigned to the assignee hereof.

BACKGROUND

The following relates generally to wireless communication, and more specifically to energy efficient discovery and traffic management in a mesh wireless access network (WAN) for internet of everything devices (IoEs) with a wakeup receiver.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless systems, IoEs may transmit data to a base station through a relay device. The relay device may frequently wakeup and transmit discovery broadcasts for identification and synchronization. The relay device may use a large energy overhead for these discovery broadcast transmissions regardless of whether it is relaying significant amounts of data.

SUMMARY

A relay device in a mesh wireless access network (WAN) may listen for a signal during a pre-wakeup (PWU) period to determine whether to power on a radio during a wakeup cycle. If the relay device receives a signal during the PWU period, it may power on a radio to transmit a discovery broadcast or to send and receive data. The relay device may also receive synchronization signals during the PWU period to maintain timing synchronization in cases when the wakeup cycle includes long periods of inactivity. That is, different interne of everything (IoE) devices (including relay devices) may operate in different discovery modes based on different mobility patterns. Devices that move frequently may operate in a transient operating mode. Devices that rarely move may operate in a persistent operating mode, and may take advantage of the PWU synchronization signals.

A first method of wireless communication is described. The method may include receiving a PWU signal from a user equipment (UE) during a PWU period that is prior to a discovery period, wherein the discovery period is based at least in part on a periodic wakeup configuration, and transmitting a discovery broadcast during the discovery period based at least in part on receiving the PWU signal.

An apparatus for wireless communication is described. The apparatus may include means for receiving a PWU signal from a UE during a PWU period that is prior to a discovery period, wherein the discovery period is based at least in part on a periodic wakeup configuration, and means for transmitting a discovery broadcast during the discovery period based at least in part on receiving the PWU signal.

Another apparatus for wireless communication is described. The apparatus may include a processor, memory in electronic communication with the processor, and instructions stored in the memory. The instructions may be operable to cause the processor to receive a PWU signal from a UE during a PWU period that is prior to a discovery period, wherein the discovery period is based at least in part on a periodic wakeup configuration, and transmit a discovery broadcast during the discovery period based at least in part on receiving the PWU signal.

A non-transitory computer readable medium for wireless communication is described. The non-transitory computer-readable medium may include instructions operable to cause a processor to receive a PWU signal from a UE during a PWU period that is prior to a discovery period, wherein the discovery period is based at least in part on a periodic wakeup configuration, and transmit a discovery broadcast during the discovery period based at least in part on receiving the PWU signal.

Some examples of the method, apparatus, and non-transitory computer-readable medium described above may further include processes, features, means, or instructions for determining that a second PWU signal may be not received during a second PWU period that may be prior to a second discovery period. Some examples of the method, apparatus, and non-transitory computer-readable medium described above may further include processes, features, means, or instructions for refraining from transmitting a second discovery broadcast during a second discovery period based at least in part on the determination that the second PWU signal may have not been received.

Some examples of the method, apparatus, and non-transitory computer-readable medium described above may further include processes, features, means, or instructions for refraining from powering up one or more radio components during a wakeup cycle based at least in part on the determination that the second PWU signal may have not been received.

Some examples of the method, apparatus, and non-transitory computer-readable medium described above may further include processes, features, means, or instructions for determining that a second PWU signal may be not received during a second PWU period that may be prior to a second discovery period. Some examples of the method, apparatus, and non-transitory computer-readable medium described above may further include processes, features, means, or instructions for transmitting a second discovery broadcast during the second discovery period based at least in part on a periodic broadcast parameter. In some examples, the second discovery period may occur prior to or subsequent the discovery period.

Some examples of the method, apparatus, and non-transitory computer-readable medium described above may further include processes, features, means, or instructions for receiving a data message from the UE. Some examples of the method, apparatus, and non-transitory computer-readable medium described above may further include processes, features, means, or instructions for transmitting the data message to a base station or a relay device based at least in part on receiving the PWU signal.

Some examples of the method, apparatus, and non-transitory computer-readable medium described above may further include processes, features, means, or instructions for receiving a synchronization signal during the PWU period. Some examples of the method, apparatus, and non-transitory computer-readable medium described above may further include processes, features, means, or instructions for performing a synchronization process based at least in part on the synchronization signal.

In some examples of the method, apparatus, and non-transitory computer-readable medium described above, the synchronization signal may be received from a base station or a relay device.

In some examples of the method, apparatus, and non-transitory computer-readable medium described above, receiving the PWU signal may comprise receiving synchronization information. Some examples of the method, apparatus, and non-transitory computer-readable medium described above may further include processes, features, means, or instructions for performing a synchronization process based at least in part on the synchronization information.

In some examples of the method, apparatus, and non-transitory computer-readable medium described above, the PWU signal comprises an identifier and the discovery broadcast or a data message may be transmitted based at least in part on the identifier.

In some examples of the method, apparatus, and non-transitory computer-readable medium described above, the identifier comprises a device-specific identifier.

In some examples of the method, apparatus, and non-transitory computer-readable medium described above, the identifier comprises a cell-specific identifier.

Some examples of the method, apparatus, and non-transitory computer-readable medium described above may further include processes, features, means, or instructions for transmitting a PWU configuration signal to the UE, wherein the PWU configuration signal comprises an identifier, a wakeup cycle, or both, and wherein the PWU signal may be received based at least in part on the PWU configuration signal.

In some examples of the method, apparatus, and non-transitory computer-readable medium described above, the PWU signal comprises a single tone beacon.

In some examples of the method, apparatus, and non-transitory computer-readable medium described above, the PWU signal may be received based at least in part on a hopping pattern associated with a cell or a relay device.

In some examples of the method, apparatus, and non-transitory computer-readable medium described above, the PWU signal may be received using a low power receiver, wherein the low power receiver may have a lower power consumption than a second receiver located within a same device.

In some examples of the method, apparatus, and non-transitory computer-readable medium described above, the periodic wakeup configuration supports a mesh network of low power devices.

A second method of wireless communication is described. The method may include receiving a PWU configuration signal from a relay device, wherein the PWU configuration signal is based at least in part on a periodic wakeup configuration, transmitting a PWU signal to the relay device based at least in part on the PWU configuration signal, and transmitting a data message to the relay device based at least in part on transmitting the PWU signal.

An apparatus for wireless communication is described. The apparatus may include means for receiving a PWU configuration signal from a relay device, wherein the PWU configuration signal is based at least in part on a periodic wakeup configuration, means for transmitting a PWU signal to the relay device based at least in part on the PWU configuration signal, and means for transmitting a data message to the relay device based at least in part on transmitting the PWU signal.

Another apparatus for wireless communication is described. The apparatus may include a processor, memory in electronic communication with the processor, and instructions stored in the memory. The instructions may be operable to cause the processor to receive a PWU configuration signal from a relay device, wherein the PWU configuration signal is based at least in part on a periodic wakeup configuration, transmit a PWU signal to the relay device based at least in part on the PWU configuration signal, and transmit a data message to the relay device based at least in part on transmitting the PWU signal.

A non-transitory computer readable medium for wireless communication is described. The non-transitory computer-readable medium may include instructions operable to cause a processor to receive a PWU configuration signal from a relay device, wherein the PWU configuration signal is based at least in part on a periodic wakeup configuration, transmit a PWU signal to the relay device based at least in part on the PWU configuration signal, and transmit a data message to the relay device based at least in part on transmitting the PWU signal.

In some examples of the method, apparatus, and non-transitory computer-readable medium described above, the PWU configuration signal comprises an identifier, a wakeup cycle, or both, and the PWU signal may be received based at least in part on the PWU configuration signal.

In some examples of the method, apparatus, and non-transitory computer-readable medium described above, the periodic wakeup configuration supports a mesh network of low power devices.

In some examples of the method, apparatus, and non-transitory computer-readable medium described above, transmitting the PWU signal may comprise transmitting synchronization information to the relay device.

A third method of wireless communication is described. The method may include transmitting a synchronization signal to a relay device during a PWU period of the relay device, wherein the PWU period is based at least in part on a periodic wakeup configuration, and receiving a discovery broadcast during a discovery period of the periodic wakeup configuration based at least in part on the synchronization signal.

An apparatus for wireless communication is described. The apparatus may include means for transmitting a synchronization signal to a relay device during a PWU period of the relay device, wherein the PWU period is based at least in part on a periodic wakeup configuration, and means for receiving a discovery broadcast during a discovery period of the periodic wakeup configuration based at least in part on the synchronization signal.

Another apparatus for wireless communication is described. The apparatus may include a processor, memory in electronic communication with the processor, and instructions stored in the memory. The instructions may be operable to cause the processor to transmit a synchronization signal to a relay device during a PWU period of the relay device, wherein the PWU period is based at least in part on a periodic wakeup configuration, and receive a discovery broadcast during a discovery period of the periodic wakeup configuration based at least in part on the synchronization signal.

A non-transitory computer readable medium for wireless communication is described. The non-transitory computer-readable medium may include instructions operable to cause a processor to transmit a synchronization signal to a relay device during a PWU period of the relay device, wherein the PWU period is based at least in part on a periodic wakeup configuration, and receive a discovery broadcast during a discovery period of the periodic wakeup configuration based at least in part on the synchronization signal.

Some examples of the method, apparatus, and non-transitory computer-readable medium described above may further include processes, features, means, or instructions for communicating with the relay device based at least in part on the discovery broadcast.

Some examples of the method, apparatus, and non-transitory computer-readable medium described above may further include processes, features, means, or instructions for transmitting a PWU configuration signal to the relay device, wherein the PWU configuration signal comprises an identifier, a wakeup cycle, or both, and wherein the discovery broadcast may be received based at least in part on the PWU configuration signal.

In some examples of the method, apparatus, and non-transitory computer-readable medium described above, the periodic wakeup configuration supports a mesh network of low power devices.

DETAILED DESCRIPTION

In a mesh wireless access network (WAN), an internet of everything (IoE) device may transmit to a base station through a relay device. The IoE devices (including the relay devices) may periodically enter an idle state between regular wakeup intervals in order to conserve power. The relay device may then power up a low power radio during a pre-wakeup (PWU) period prior to a discovery period of a wakeup interval. In some cases, the relay device may frequently wakeup from the idle state and transmit discovery broadcasts for identification and synchronization. The frequent wakeup processes and discovery broadcast transmissions may use a large energy overhead.

In some cases, the relay device may perform discovery broadcasts even if it is not consistently transmitting data, making the large energy overhead ineffectual. Thus, the relay device may instead determine whether to wakeup and transmit a discovery broadcast during the discovery period based on receiving a signal during the PWU period. In some cases, the PWU signal may be based on a beacon signal. Additionally or alternatively, the relay device may receive a synchronization signal during the PWU period.

In some implementations discussed in the present disclosure, the relay device may indicate its wakeup cycle and PWU signal configurations in the discovery broadcast. This PWU configuration information may include an identifier based on the identity of the relay device, or on the cell for which it is acting as relay.

Aspects of the disclosure are initially described in the context of a wireless communications system. Examples of a PWU period and a process flow are then described. Aspects of the disclosure are further illustrated by and described with reference to diagrams and flowcharts that relate to energy efficient discovery and traffic management in a mesh WAN for internet of everything devices (IoEs) with a wakeup receiver.

Figure 1:
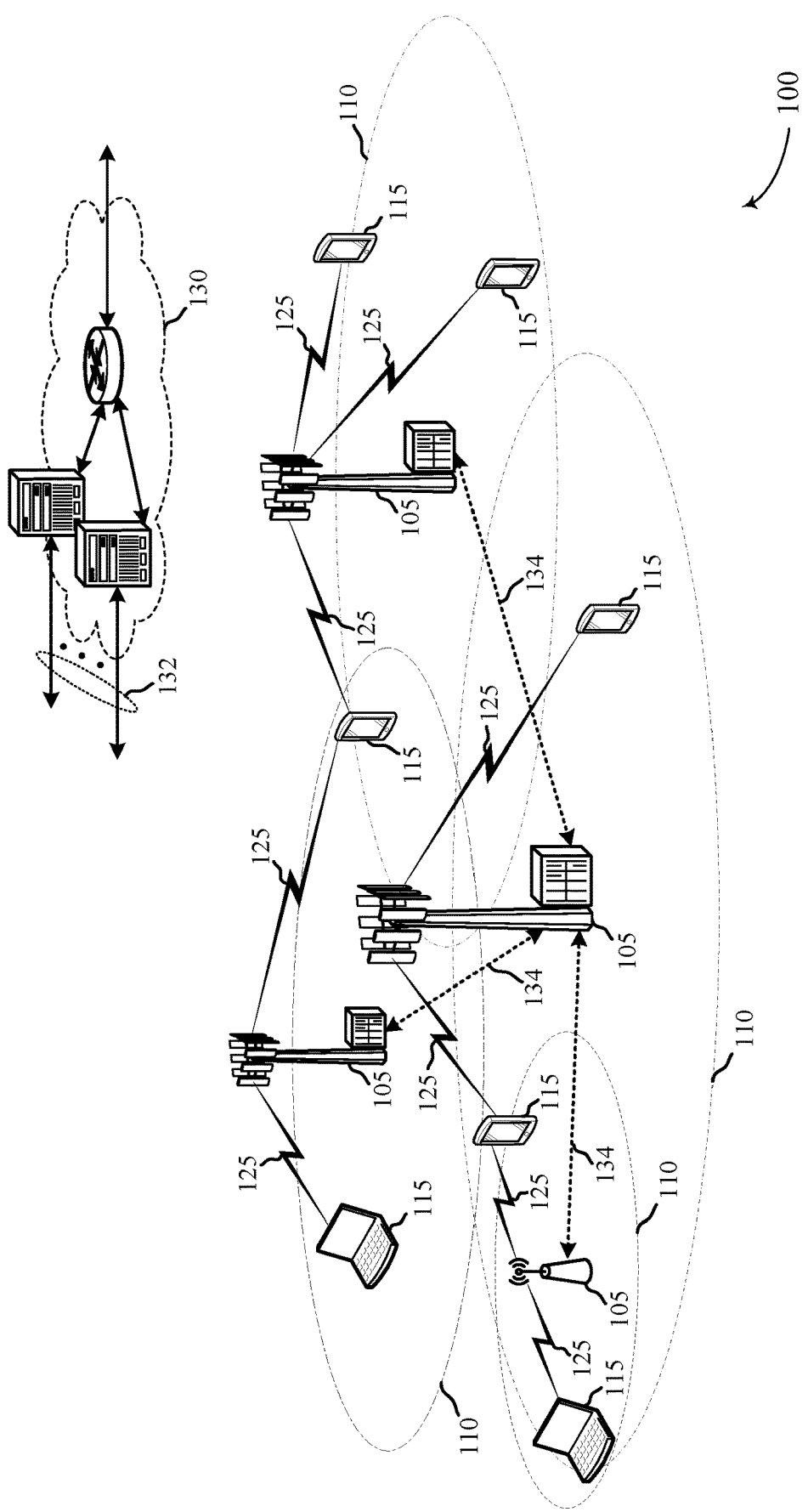
FIGS. 1 and 2 illustrate examples of a wireless communications system that supports energy efficient discovery and traffic management in a mesh wireless access network (WAN) for internet of everything devices (IoEs) with a wakeup receiver in accordance with various aspects of the present disclosure.

FIG. 1 illustrates an example of a wireless communications system 100 that supports energy efficient discovery and traffic management in a mesh WAN for IoEs with a wakeup receiver in accordance with various aspects of the present disclosure. The wireless communications system 100 includes base stations 105, user equipment (UEs) 115, and a core network 130. In some examples, the wireless communications system 100 may be a long term evolution (LTE), LTE-Advanced (LTE-A), or New Radio (NR) network. In some cases, wireless communications system 100 may support enhanced broadband communications, ultra-reliable (i.e., mission critical) communications, low latency communications, and communications with low-cost and low-complexity devices. In some wireless systems (e.g., a mesh WAN), a relay device may determine whether to wakeup and transmit a discovery broadcast based on receiving a PWU signal.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink or downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, a relay device, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an IoE device, a machine type communication (MTC) device, an appliance, an automobile, or the like.

In some cases, a UE 115 may also be able to communicate directly with other UEs (e.g., using a peer-to-peer (P2P), mesh network, or device-to-device (D2D) protocol). One or more of a group of UEs 115 utilizing D2D communications may be within the coverage area 110 of a cell. Other UEs 115 in such a group may be outside the coverage area 110 of the cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105. In a mesh WAN, a UE 115 may transmit data to a second UE 115 (e.g., a relay device), and the second UE 115 may transmit the data to a base station 105. A UE 115 acting as a relay may transmit periodic discovery broadcasts to indicate to other UEs 115 and/or base stations 105 that it is available.

Some UEs 115, such as MTC, IoT, or IoE devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions. In some cases, a UE 115 may operate in discontinuous reception (DRX) during a PWU period. In DRX, the UE 115 may enter a sleep state when not in active communication.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one packet data network gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operates according to a layered protocol stack. In the user plane, communications at the bearer or packet data convergence protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat requests (HARQs) to provide retransmission at the MAC layer to improve link efficiency. In the control plane, the radio resource control (RRC) protocol layer may provide establishment, configuration, and maintenance of an RRC connection between a UE 115 and a base station 105 or core network 130 supporting radio bearers for user plane data. At the physical (PHY) layer, transport channels may be mapped to physical channels.

Time intervals in LTE or NR may be expressed in multiples of a basic time unit (which may be a sampling period of $T_s=1/30{,}720{,}000$ seconds). Time resources may be organized according to radio frames with lengths of 10 ms ($T_f=307200T_s$), which may be identified by a system frame number (SFN) ranging from 0 to 1023. Each frame may include ten 1ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplex (FDD) and time division duplex (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds).

In some cases, wireless communications system 100 may utilize both licensed and unlicensed radio frequency spectrum bands. For example, wireless communications system 100 may employ LTE License Assisted Access (LTE-LAA) or LTE Unlicensed (LTE-U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

In a mesh WAN, an IoE device (e.g., a first UE 115) may transmit to a base station 105 through a relay device (e.g., a second UE 115). In some cases in the mesh WAN, the first UE 115 may operate in a location with poor coverage from the base station 105. Instead of transmitting directly to the base station 105 over a poor connection, the first UE 115 may transmit data to a better located second UE 115, and the second UE 115 may transmit the data to the base station 105. The second UE 115 may be referred to as a relay device. The first UE 115 and the second UE 115 may conserve their batteries by entering a sleep state whenever they are not transmitting or receiving.

The second UE 115 may transmit periodic discovery broadcasts during time periods when both the second UE 115 and the first UE 115 are awake (i.e., not in the sleep state). The time periods may be referred to as discovery periods. The first UE 115 may receive a discovery broadcast during the discovery period, and may identify potential relay devices and their capabilities based on the discovery broadcast. The first UE 115 and the second UE 115 may operate in various traffic modes. For example, the first UE 115 and the second UE 115 may schedule transmissions based on received signals from the base station 105. In other examples, the first UE 115 and the second UE 115 may schedule transmissions based on distributed scheduling.

IoE devices (e.g., UEs 115) may have different mobility patterns. In one scenario, an essentially stationary UE 115 may primarily operate for metering and sensing. The stationary UE 115 may handle light traffic. In some examples, the light traffic may be periodic (e.g., temperature and humidity sensing every hour). In other examples, the light traffic may be sporadically driven by events (e.g., a water leak). The stationary UE 115 may have a battery life goal of multiple years. In another scenario, a mobile UE 115 may primarily operate for asset tracking and logistics. The mobile UE 115 may handle data exchanges of variable lengths. For example, the mobile UE 115 may usually transmit small data packets, but may occasionally transmit large data packets. The mobile UE 115 may have a battery life goal of a few days.

An IoE device (e.g., a UE 115) may operate in different discovery modes based on the different mobility patterns. The UE 115 may use separate resources and different transmission periodicities for discovery broadcast transmissions in the different discovery modes. In one case, a first UE 115 may be a stationary relay device. The first UE 115 may operate in persistent mode. The first UE 115 may reserve specific resources for persistent mode discovery broadcast transmission, and may utilize the same specific resources for persistent mode discovery broadcast transmission in each discovery period. In another case, a second UE 115 may be a mobile relay device. The second UE 115 may operate in transient mode. The transient mode discovery broadcast transmissions may occur more often than the persistent mode discovery broadcast transmissions. In some cases, the persistent mode discovery broadcast transmissions may occur periodically in a same frame as the transient mode discovery broadcast transmissions. The second UE 115 may randomly select resources for transient mode discovery broadcast transmission. The second UE 115 may select a different random resource for transient mode discovery broadcast transmission in each discovery period. The second UE 115 may not store the random resources used in past discovery periods in its memory.

An IoE device (e.g., a UE 115) may have a PWU duration before an 'ON' duration. The UE 115 may monitor control signals during the PWU duration. The UE 115 may determine whether to enter a full wakeup state for the 'ON' duration based on the control signals. The PWU duration may allow the UE 115 to conserve power by operating in a DRX state. In the DRX state, the UE 115 may enter a sleep state in between PWU durations. In some cases, the UE 115 may schedule a gap of multiple subframes between the PWU duration and the 'ON' duration to allow for baseband warmup. The control signals received during the PWU duration may be designed for a low search complexity and for a low-power wakeup receiver.

Figure 2:
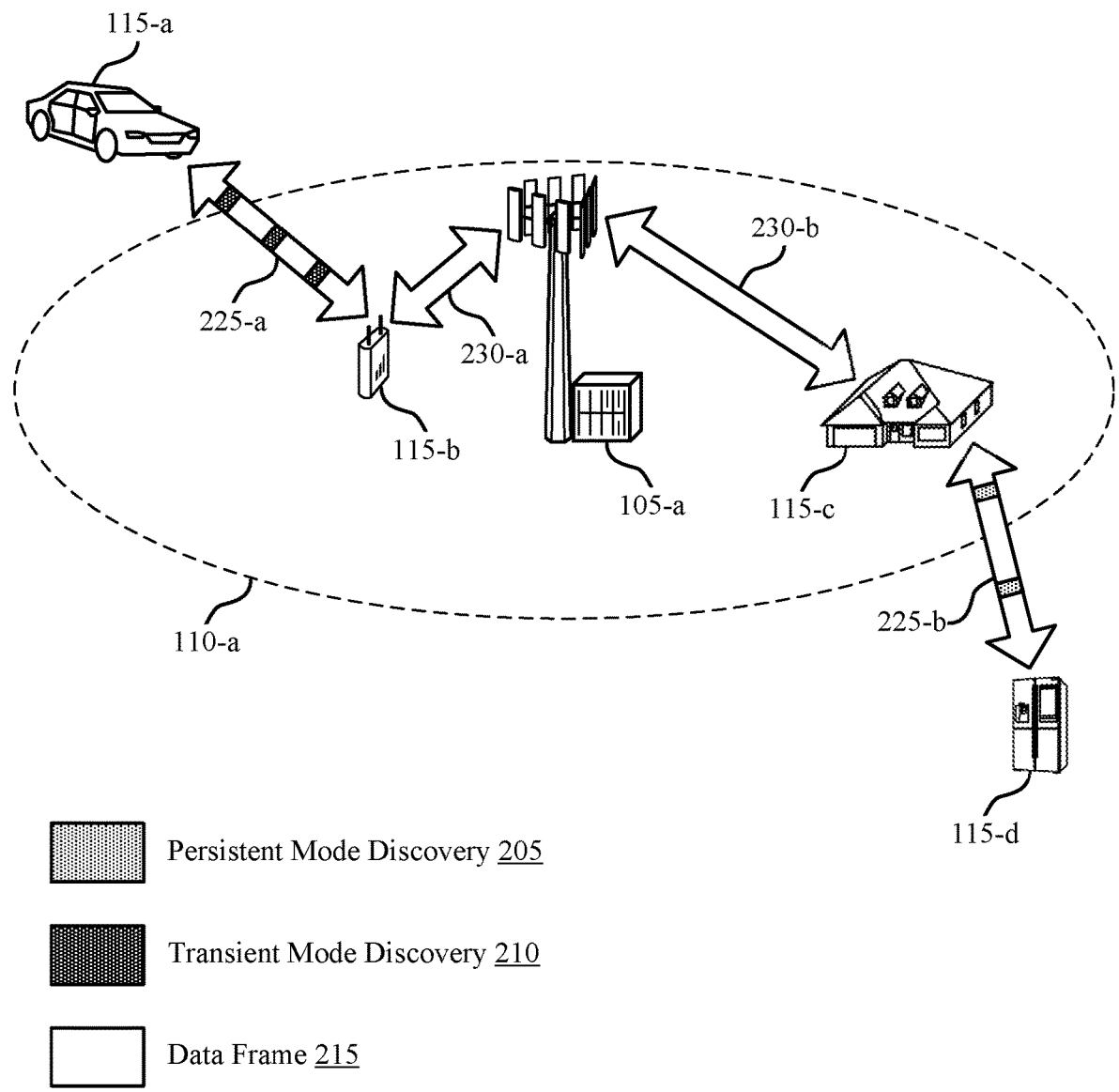

FIG. 2 illustrates an example of a wireless communications system 200 that supports energy efficient discovery and traffic management in a mesh WAN for IoEs with a wakeup receiver in accordance with various aspects of the present disclosure. Wireless communications system 200 may include base station 105-a and UEs 115-a, 115-b, 115-c, and 115-d, which may be examples of the corresponding devices described with reference to FIG. 1. UEs 115-a and 115-d may also be examples of IoE devices. UEs 115-b and 115-c may be examples of relay devices. UEs 115-a and 115-d may communicate with UEs 115-b and 115-c, respectively, over communication links 225-a and 225-b. UEs 115-b and 115-c may communicate with base station 105-a over communication links 230-a and 230-b, respectively. In some cases, the UEs 115 may schedule transmissions according to timeline 220. UEs 115-a and 115-d may or may not be located within geographic coverage area 110-a, which may be an example of a geographic coverage area 110 as described with reference to FIG. 1.

A relay device (e.g., a UE 115) may determine whether to wakeup and transmit a discovery broadcast based on receiving a PWU signal. A mobile relay device (e.g., UE 115-b) may transmit the discovery broadcast 210 in transient mode, while a stationary relay device (e.g., UE 115-c) may transmit the discovery broadcast 205 in persistent mode. A relay device, especially a mobile relay device such as UE 115-b operating in transient mode, may be scheduled for frequent discovery periods. According to the present disclosure, a relay device such as UE 115-b or UE 115-c may listen for a signal during the PWU period (i.e., using a low power receiver) before determining whether to power on another radio for a discovery broadcast or to relay data.

In one example, UE 115-a may transmit a PWU signal before a scheduled discovery period. UE 115-b may receive the PWU signal, and transmit discovery broadcast 210 to UE 115-a during the scheduled discovery period. In some cases, UE 115-b may not receive a PWU signal, and may refrain from transmitting discovery broadcast 210 during the scheduled discovery period. The discovery periods may be offset be data frames 215. UE 115-b may transmit at least one discovery broadcast 210 during each discovery duration, whether or not it received a PWU signal. The at least one discovery broadcast 210 may indicate a continued availability of UE 115-b to an IoE device already associated with UE 115-b.

In some cases, a relay device (e.g., a UE 115) may also receive a synchronization signal during a PWU period. The relay device, especially a stationary relay device (e.g., UE 115-c) operating in persistent mode, may wait a long duration between discovery broadcast transmissions 205. The long duration may contribute to issues in timing synchronization of UE 115-c. Base station 105-a or an IoE device (e.g., UE 115-d) may transmit a synchronization signal to UE 115-c during a PWU period prior to a scheduled discovery period. UE 115-c may receive the synchronization signal and resynchronize its timing before transmitting a discovery broadcast 205 in the scheduled discovery period.

A relay device (e.g., a UE 115) may indicate its wakeup cycle and PWU signal configurations in a discovery broadcast transmission. For example, UE 115-b may indicate to UE 115-a whether to transmit a PWU signal to UE 115-b prior to relaying traffic through it. UE 115-b may also indicate a PWU signal configuration for UE 115-a to use. In some cases, different UEs 115, such as UE 115-b and UE 115-c, may use different relay-specific PWU signal configurations. UE 115-b may transmit the indications in discovery broadcast 210 to UE 115-a. UE 115-b may skip part or all of an 'ON' duration during a nominal wakeup time if UE 115-b does not receive a PWU signal.

In some cases, a PWU signal may be based on a beacon signal. For example, the PWU signal may be a single tone beacon. In some examples, a relay device, such as UE 115-b, may have inaccurate timing synchronization, frequency synchronization, or automatic gain control (AGC). UE 115-b may detect the PWU signal transmitted by UE 115-a based on the single tone beacon despite these inaccuracies. In some examples, different UEs 115, such as UE 115-b and UE 115-c, may use different beacon tone hopping patterns to receive the PWU signal.

Figure 3:
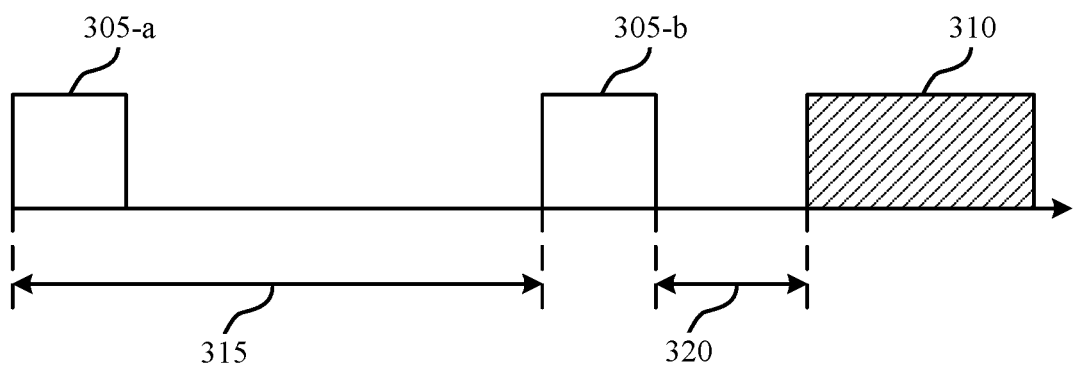
FIG. 3 illustrates an example of a pre-wakeup (PWU) period that supports energy efficient discovery and traffic management in a mesh WAN for IoEs with a wakeup receiver in accordance with various aspects of the present disclosure.

FIG. 3 illustrates an example of a PWU period 300 that supports energy efficient discovery and traffic management in a mesh WAN for IoEs with a wakeup receiver in accordance with various aspects of the present disclosure. A UE 115 may transmit a PWU signal to a relay device (e.g., a UE 115) during the PWU period 300. These may be examples of a UE 115 as described with reference to FIGS. 1 and 2.

A relay device (e.g., a UE 115 or a small cell acting as a relay) may operate in a DRX state during time period 315. The UE 115 may operate in a low power reception mode during PWU duration 305-a in the DRX state. In some cases, the UE 115 may not receive a PWU control signal during PWU duration 305-a. In these cases, the UE 115 may enter a low power sleep mode until next PWU duration 305-b. In some cases, the UE 115 may receive a PWU control signal for wakeup during PWU duration 305-b. The control signal for wakeup may specify a number of subframes before an 'ON' duration 310. The UE 115 may operate in a full device wakeup mode during the 'ON' duration 310. The UE 115 may use the time period 320 defined by the number of subframes specified in the control signal for wakeup for baseband warmup between the DRX state in time period 315 and the 'ON' duration 310. The control signal for wakeup may be designed for a low search complexity and for reception by a low power wakeup receiver.

Figure 4:
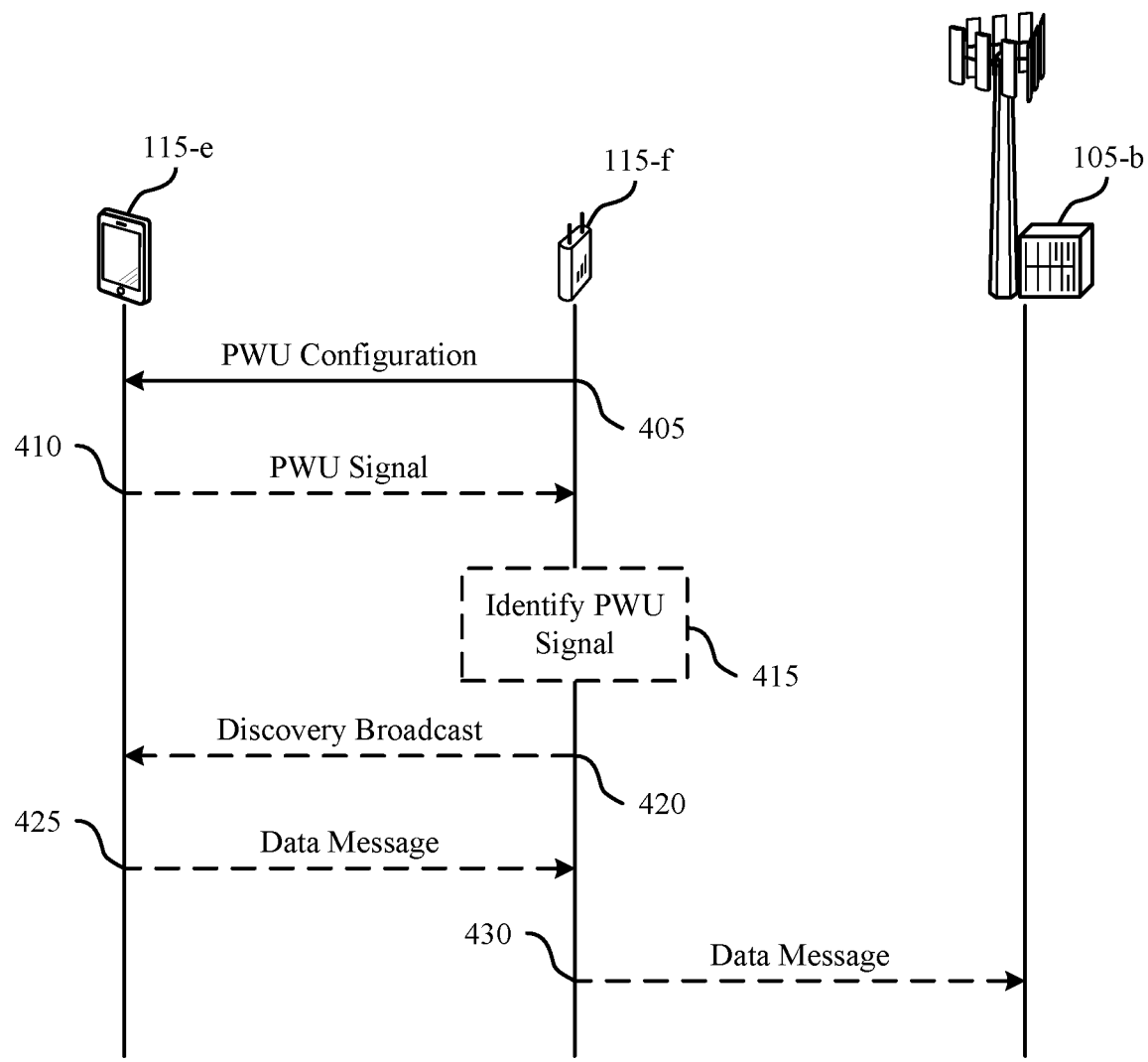
FIG. 4 illustrates an example of a process flow that supports energy efficient discovery and traffic management in a mesh WAN for IoEs with a wakeup receiver in accordance with various aspects of the present disclosure.

FIG. 4 illustrates an example of a process flow 400 that supports energy efficient discovery and traffic management in a mesh WAN for IoEs with a wakeup receiver in accordance with various aspects of the present disclosure. Process flow 400 may include base station 105-b and UEs 115-e and 115-f, which may be examples of a base station 105 and a UE 115 as described herein with reference to FIGS. 1 and 2. UEs 115-e and 115-f may further be examples of IoE devices, and UE 115-f may be an example of a relay device.

At step 405, UE 115-f may transmit a PWU configuration signal to UE 115-e. In some cases, the PWU configuration signal may include an identifier (e.g., a relay identifier, a network identifier, etc.), a wakeup cycle, or both. The PWU configuration signal may be based on a periodic wakeup configuration. The periodic wakeup configuration may support a mesh network of low power devices. UE 115-e may receive the PWU configuration signal. In some cases, the PWU configuration signal may be transmitted as part of a discovery broadcast.

At step 410, UE 115-e may transmit a PWU signal to UE 115-f. The PWU signal or may be based on the received PWU configuration signal. UE 115-f may receive the PWU signal during a PWU period (e.g., using a low power receiver) prior to a discovery broadcast period. The PWU signal may include an identifier (e.g., a relay identifier, a network identifier, etc.). In some examples, the identifier may be a device-specific identifier. In other examples, the identifier may be a cell-specific identifier. In some cases, the PWU signal may be a single tone beacon.

In some cases, UE 115-f may receive the PWU signal based on a hopping pattern associated with a cell or (or with the relay device itself). In some cases, UE 115-f may receive the PWU signal using a low power receiver (i.e., a receiver with a lower power consumption than a second receiver located on UE 115-f). In some cases, UE 115-e may additionally transmit a synchronization signal to UE 115-f during the PWU period. UE 115-f may perform a synchronization process based on the synchronization signal.

At step 415, UE 115-f may determine whether the PWU signal was received during the PWU period. If the PWU was received, UE 115-f may transmit a discovery broadcast at step 420 during the discovery period. The transmission of the discovery broadcast may be based on receiving the PWU signal. In some cases, the transmission of the discovery broadcast may be based on the identifier. If the PWU was not received, UE 115-f may refrain from transmitting a discovery broadcast during the discovery period. The refraining from transmitting may be based on not receiving the PWU signal.

At step 425, UE 115-e may transmit a data message to UE 115-f. The transmission of the data message may be based on the transmission of the PWU signal or on receiving the discovery broadcast. UE 115-f may receive the data message, and at step 430 may transmit the data message to base station 105-b based on receiving the PWU signal. In other examples, UE 115-f may receive data from base station 105-b and relay the data to UE 115-e.

Figure 5:
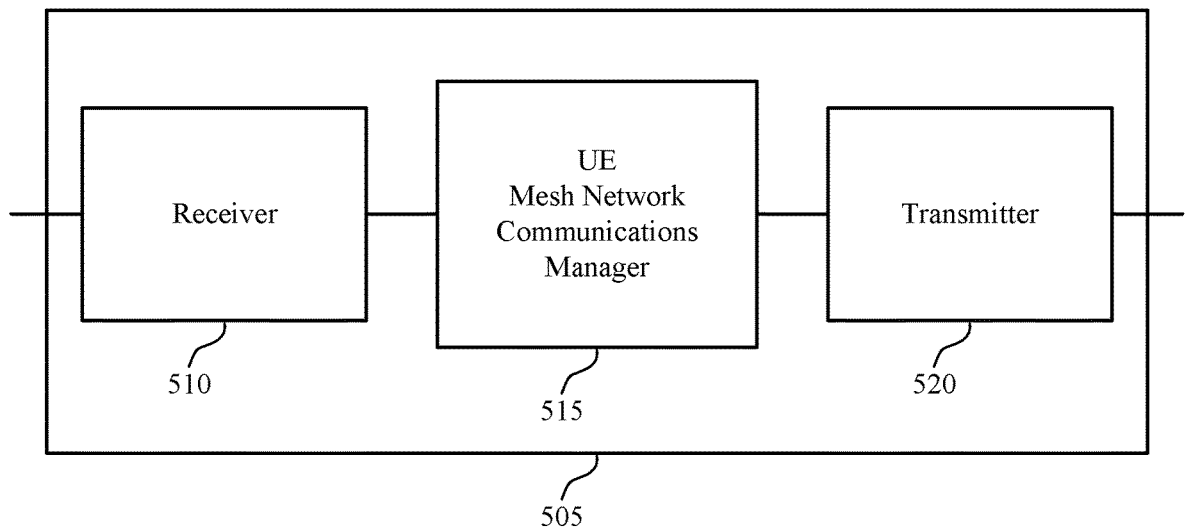
FIGS. 5 through 7 show diagrams of a device that supports energy efficient discovery and traffic management in a mesh WAN for IoEs with a wakeup receiver in accordance with various aspects of the present disclosure.

FIG. 5 shows a diagram 500 of a wireless device 505 that supports energy efficient discovery and traffic management in a mesh WAN for IoEs with a wakeup receiver in accordance with various aspects of the present disclosure. Wireless device 505 may be an example of aspects of a UE 115 as described with reference to FIGS. 1 and 2. Wireless device 505 may include receiver 510, UE mesh network communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, information related to energy efficient discovery and traffic management in a mesh WAN for IoEs with a wakeup receiver, etc.). Information may be passed on to other components of the wireless device 505. The receiver 510 may be an example of aspects of the transceiver 835 described with reference to FIG. 8. In some cases, receiver 510 may receive a data message from a UE 115.

UE mesh network communications manager 515 may be an example of aspects of the UE mesh network communications manager 815 described with reference to FIG. 8. UE mesh network communications manager 515 may receive a PWU signal from the UE 115 during a PWU period that is prior to a discovery period, where the discovery period is based on a periodic wakeup configuration, and may transmit a discovery broadcast during the discovery period based on receiving the PWU signal. The UE mesh network communications manager 515 may also receive a PWU configuration signal from a relay device, where the PWU configuration signal is based on a periodic wakeup configuration, and may transmit a PWU signal to the relay device based on the PWU configuration signal.

Transmitter 520 may transmit signals generated by other components of the device. In some examples, the transmitter 520 may be collocated with a receiver 510 in a transceiver module. For example, the transmitter 520 may be an example of aspects of the transceiver 835 as described with reference to FIG. 8. The transmitter 520 may include a single antenna, or it may include a set of antennas. Transmitter 520 may transmit a data message to the relay device based on transmitting the PWU signal.

Figure 6:
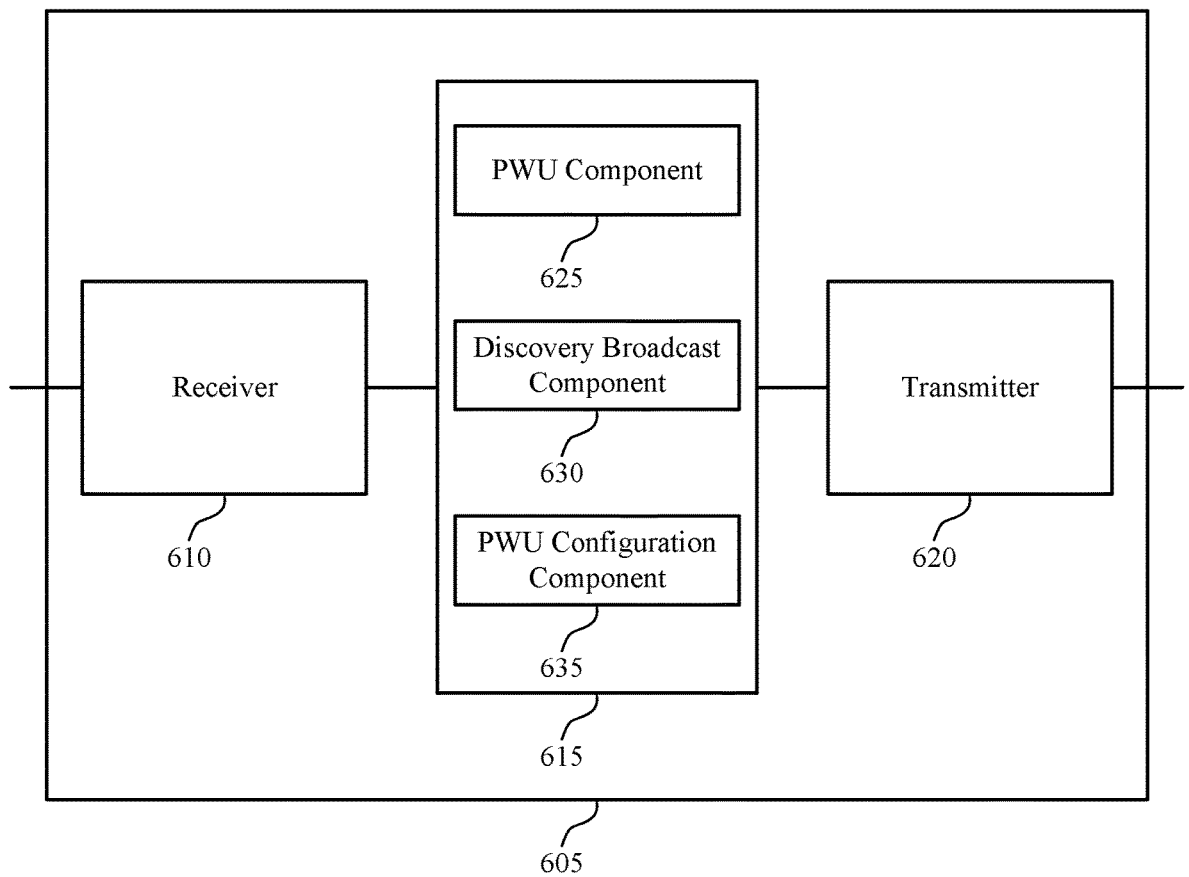

FIG. 6 shows a diagram 600 of a wireless device 605 that supports energy efficient discovery and traffic management in a mesh WAN for IoEs with a wakeup receiver in accordance with various aspects of the present disclosure. Wireless device 605 may be an example of aspects of a wireless device 505 or a UE 115 as described with reference to FIGS. 1, 2, and 5. Wireless device 605 may include receiver 610, UE mesh network communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, information related to energy efficient discovery and traffic management in a mesh WAN for IoEs with a wakeup receiver, etc.). Information may be passed on to other components of the wireless device 605. The receiver 610 may be an example of aspects of the transceiver 835 described with reference to FIG. 8.

UE mesh network communications manager 615 may be an example of aspects of a UE mesh network communications manager 515 or 815, as described with reference to FIGS. 5 and 8. UE mesh network communications manager 615 may also include PWU component 625, discovery broadcast component 630, and PWU configuration component 635.

PWU component 625 may receive a PWU signal from a UE 115 during a PWU period that is prior to a discovery period, where the discovery period is based on a periodic wakeup configuration, and may determine that a second PWU signal is not received during a second PWU period that is prior to a second discovery period. In some cases, the PWU component 625 may determine that the second PWU signal is not received prior to receiving the PWU signal. In other cases, the PWU component 625 may determine that the second PWU signal is not received subsequent to receiving the PWU signal. In some cases, receiving the PWU signal may include receiving synchronization information. PWU component 625 may also, in some examples, transmit a PWU signal to a relay device based on the PWU configuration signal. In some cases, transmitting the PWU signal may include transmitting synchronization information to the relay device as well.

In some cases, the PWU signal includes an identifier and the discovery broadcast or a data message is transmitted based on the identifier. In some cases, the identifier includes a device-specific identifier. In some cases, the identifier includes a cell-specific identifier. In some cases, the PWU signal includes a single tone beacon. In some cases, the PWU signal is received based on a hopping pattern associated with a cell or a relay device. In some cases, the PWU signal is received using a low power receiver, where the low power receiver has a lower power consumption than a second receiver located within a same device. In some cases, the periodic wakeup configuration supports a mesh network of low power devices.

Discovery broadcast component 630 may transmit a discovery broadcast during the discovery period based on receiving the PWU signal, may refrain from transmitting a second discovery broadcast during a second discovery period based on the determination that the second PWU signal has not been received, and may transmit a second discovery broadcast during the second discovery period based on a periodic broadcast parameter. In some examples, determining that the second PWU signal was not received may occur prior to or subsequent receiving the PWU signal from the UE. Additionally, the second discovery period may occur before or after the discovery period.

PWU configuration component 635 may transmit a PWU configuration signal to the UE 115, where the PWU configuration signal includes an identifier, a wakeup cycle, or both, and where the PWU signal is received based on the PWU configuration signal. PWU configuration component 635 may additionally receive a PWU configuration signal from a relay device, where the PWU configuration signal is based on a periodic wakeup configuration. In some cases, the PWU configuration signal includes an identifier, a wakeup cycle, or both, and the PWU signal is received based on the PWU configuration signal.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
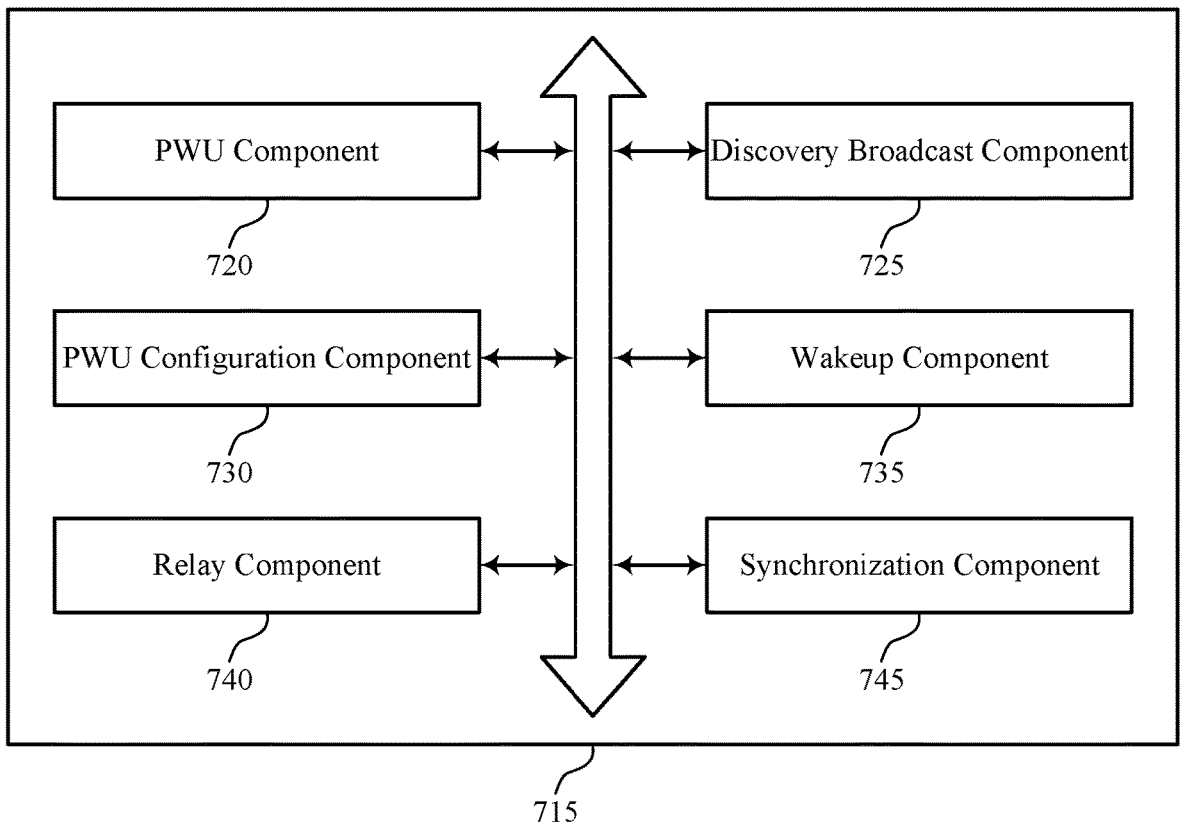

FIG. 7 shows a diagram 700 of a UE mesh network communications manager 715 that supports energy efficient discovery and traffic management in a mesh WAN for IoEs with a wakeup receiver in accordance with various aspects of the present disclosure. The UE mesh network communications manager 715 may be an example of aspects of a UE mesh network communications manager 515, 615, or 815 as described with reference to FIGS. 5, 6, and 8. The UE mesh network communications manager 715 may include PWU component 720, discovery broadcast component 725, PWU configuration component 730, wakeup component 735, relay component 740, and synchronization component 745. Each of these modules may communicate, directly or indirectly, with one another (e.g., via one or more buses).

PWU component 720 may receive a PWU signal from a UE 115 during a PWU period that is prior to a discovery period, where the discovery period is based on a periodic wakeup configuration, and may determine that a second PWU signal is not received during a second PWU period that is prior to a second discovery period. In some cases, receiving the PWU signal may include receiving synchronization information. In some cases, PWU component may transmit a PWU signal to a relay device based on the PWU configuration signal. Transmitting the PWU signal may, in some cases, include transmitting synchronization information to the relay device.

Discovery broadcast component 725 may transmit a discovery broadcast during the discovery period based on receiving the PWU signal, refrain from transmitting a second discovery broadcast during a second discovery period based on the determination that the second PWU signal has not been received, and transmit a second discovery broadcast during the second discovery period based on a periodic broadcast parameter.

PWU configuration component 730 may transmit a PWU configuration signal to the UE 115, where the PWU configuration signal includes an identifier, a wakeup cycle, or both, and where the PWU signal is received based on the PWU configuration signal. PWU configuration component 730 may receive a PWU configuration signal from a relay device, where the PWU configuration signal is based on a periodic wakeup configuration. In some cases, the PWU configuration signal includes an identifier, a wakeup cycle, or both, and the PWU signal is received based on the PWU configuration signal.

Wakeup component 735 may refrain from powering up one or more radio components during a wakeup cycle based on the determination that the second PWU signal has not been received. Relay component 740 may transmit the data message to a base station or a relay device based on receiving the PWU signal. Synchronization component 745 may receive a synchronization signal during the PWU period and perform a synchronization process based on the synchronization signal. In some cases, the synchronization signal is received from a base station 105 or a relay device. In other cases, synchronization component 745 may perform a synchronization process based on synchronization information received with the PWU signal.

Figure 8:
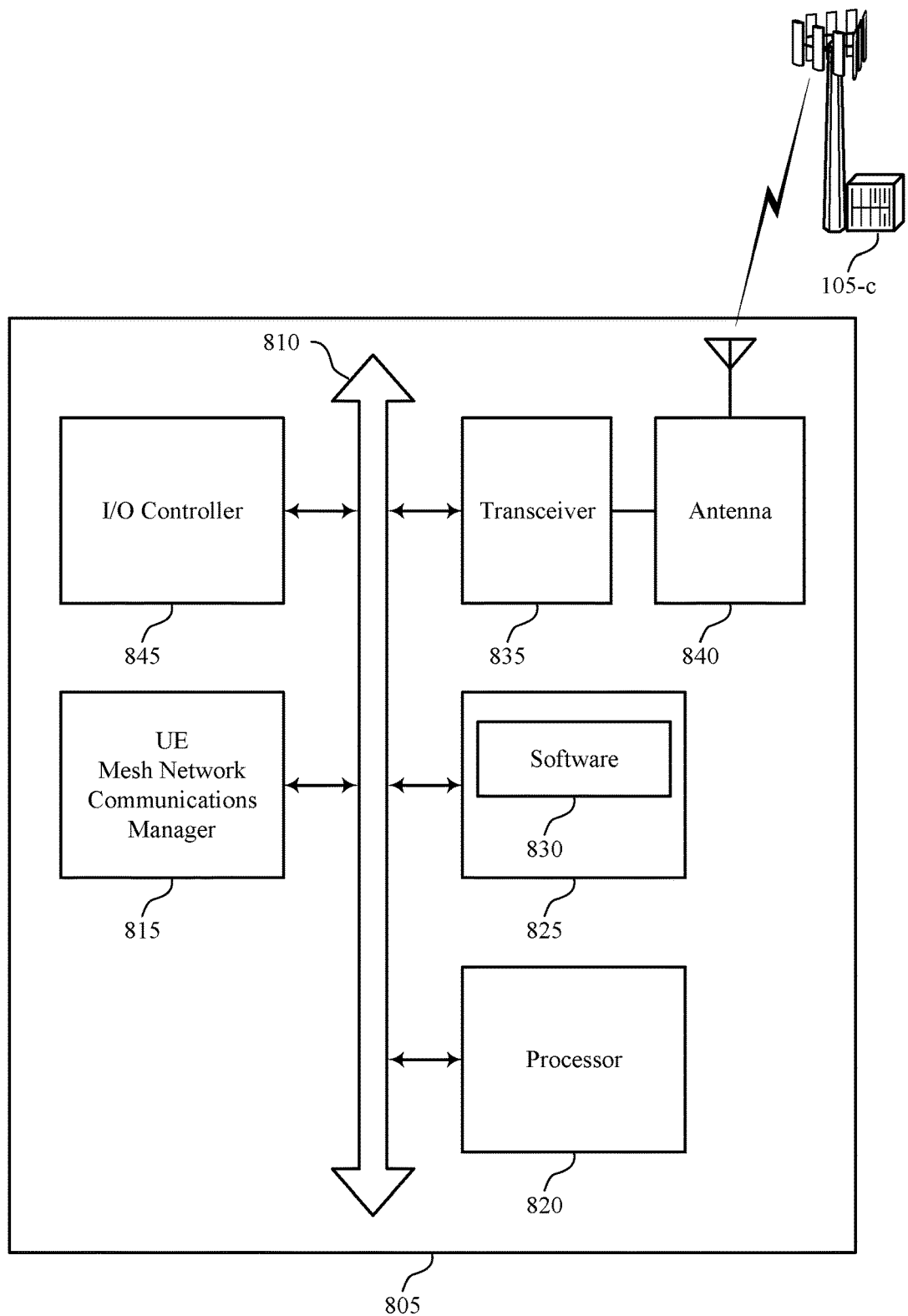
FIG. 8 illustrates a diagram of a system including a user equipment (UE) that supports energy efficient discovery and traffic management in a mesh WAN for IoEs with a wakeup receiver in accordance with various aspects of the present disclosure.

FIG. 8 shows a diagram of a system 800 including a device 805 that supports energy efficient discovery and traffic management in a mesh WAN for IoEs with a wakeup receiver in accordance with various aspects of the present disclosure. Device 805 may be an example of or include the components of wireless device 505, wireless device 605, or a UE 115 as described above, e.g., with reference to FIGS. 1, 2, 5, and 6. Device 805 may include components for bi-directional voice and data communications including components for transmitting and receiving communications, including UE mesh network communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105 (e.g., base station 105-c).

Processor 820 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting energy efficient discovery and traffic management in a mesh WAN for IoEs with a wakeup receiver).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support energy efficient discovery and traffic management in a mesh WAN for IoEs with a wakeup receiver. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the device 805 may include a single antenna 840. However, in some cases the device may have more than one antenna 840, which may be capable of concurrently transmitting or receiving multiple wireless transmissions (e.g., with base station 105-*c*).

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system.

Figure 9:
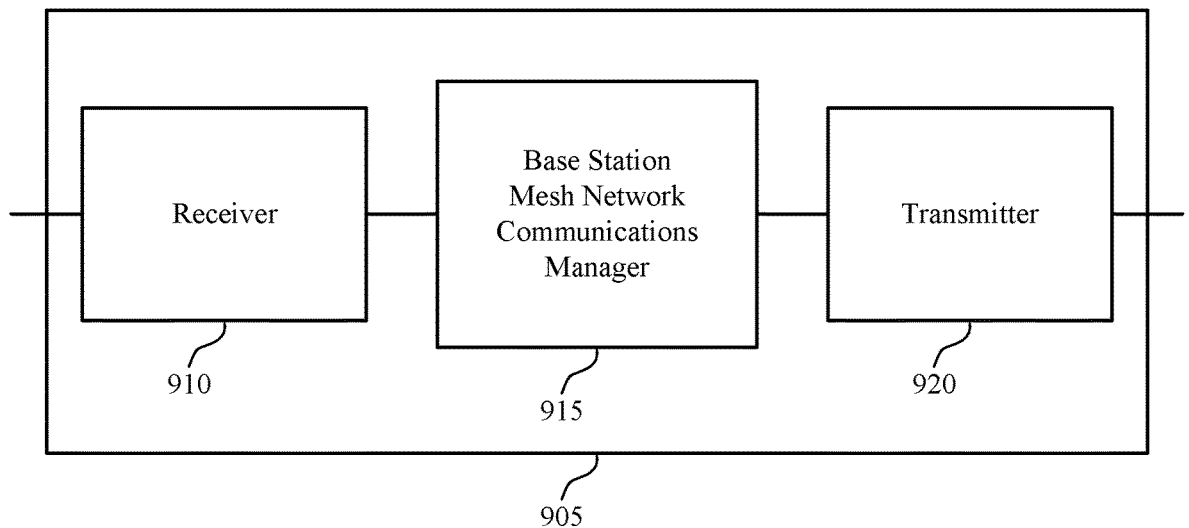
FIGS. 9 through 11 show diagrams of a device that supports energy efficient discovery and traffic management in a mesh WAN for IoEs with a wakeup receiver in accordance with various aspects of the present disclosure.

FIG. 9 shows a diagram 900 of a wireless device 905 that supports energy efficient discovery and traffic management in a mesh WAN for IoEs with a wakeup receiver in accordance with various aspects of the present disclosure. Wireless device 905 may be an example of aspects of a base station 105 as described with reference to FIGS. 1 and 2. Wireless device 905 may include receiver 910, base station mesh network communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, information related to energy efficient discovery and traffic management in a mesh WAN for IoEs with a wakeup receiver, etc.). Information may be passed on to other components of the wireless device 905. The receiver 910 may be an example of aspects of the transceiver 1235 described with reference to FIG. 12.

Base station mesh network communications manager 915 may be an example of aspects of the base station mesh network communications manager 1215 described with reference to FIG. 12. Base station mesh network communications manager 915 may transmit a synchronization signal to a relay device during a PWU period of the relay device, where the PWU period is based on a periodic wakeup configuration, and may receive a discovery broadcast during a discovery period of the periodic wakeup configuration based on the synchronization signal.

Transmitter 920 may transmit signals generated by other components of the wireless device 905. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
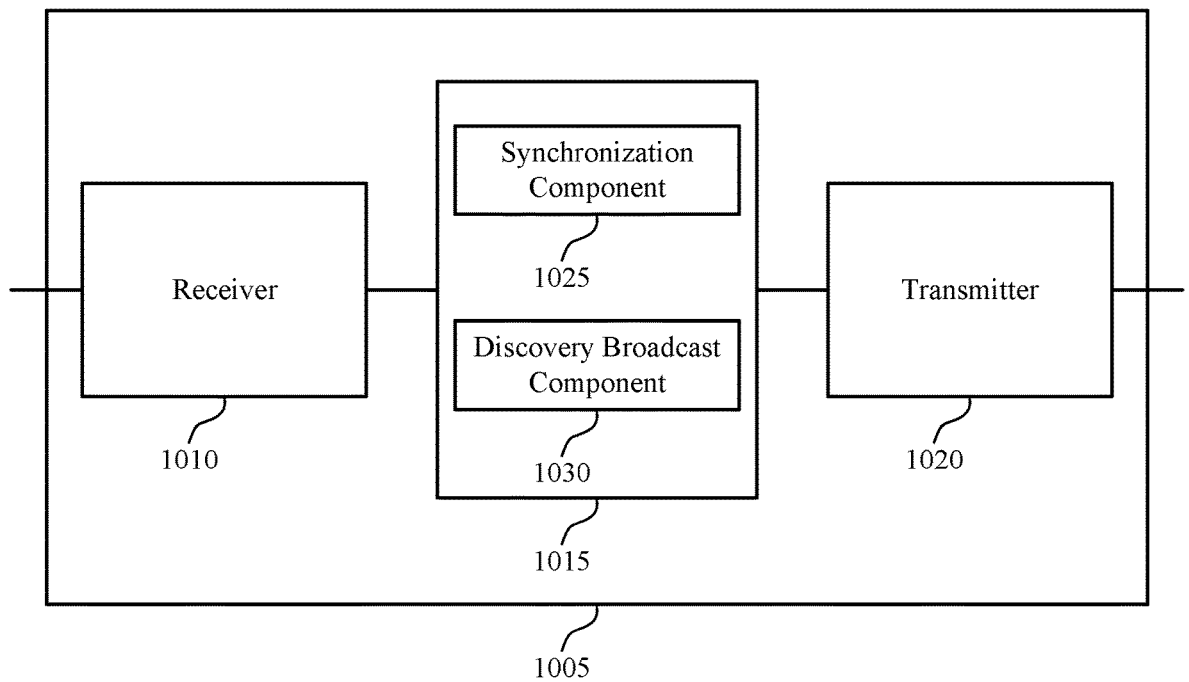

FIG. 10 shows a diagram 1000 of a wireless device 1005 that supports energy efficient discovery and traffic management in a mesh WAN for IoEs with a wakeup receiver in accordance with various aspects of the present disclosure. Wireless device 1005 may be an example of aspects of a wireless device 905 or a base station 105 as described with reference to FIGS. 1, 2, and 9. Wireless device 1005 may include receiver 1010, base station mesh network communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, information related to energy efficient discovery and traffic management in a mesh WAN for IoEs with a wakeup receiver, etc.). Information may be passed on to other components of the wireless device 1005. The receiver 1010 may be an example of aspects of the transceiver 1235 described with reference to FIG. 12.

Base station mesh network communications manager 1015 may be an example of aspects of a base station mesh network communications manager 915 or 1215 as described with reference to FIGS. 9 and 12. In some cases, base station mesh network communications manager 1015 may also include synchronization component 1025 and discovery broadcast component 1030.

Synchronization component 1025 may transmit a synchronization signal to a relay device during a PWU period of the relay device, where the PWU period is based on a periodic wakeup configuration. In some cases, the periodic wakeup configuration supports a mesh network of low power devices. Discovery broadcast component 1030 may receive a discovery broadcast during a discovery period of the periodic wakeup configuration based on the synchronization signal.

Transmitter 1020 may transmit signals generated by other components of the wireless device 1005. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
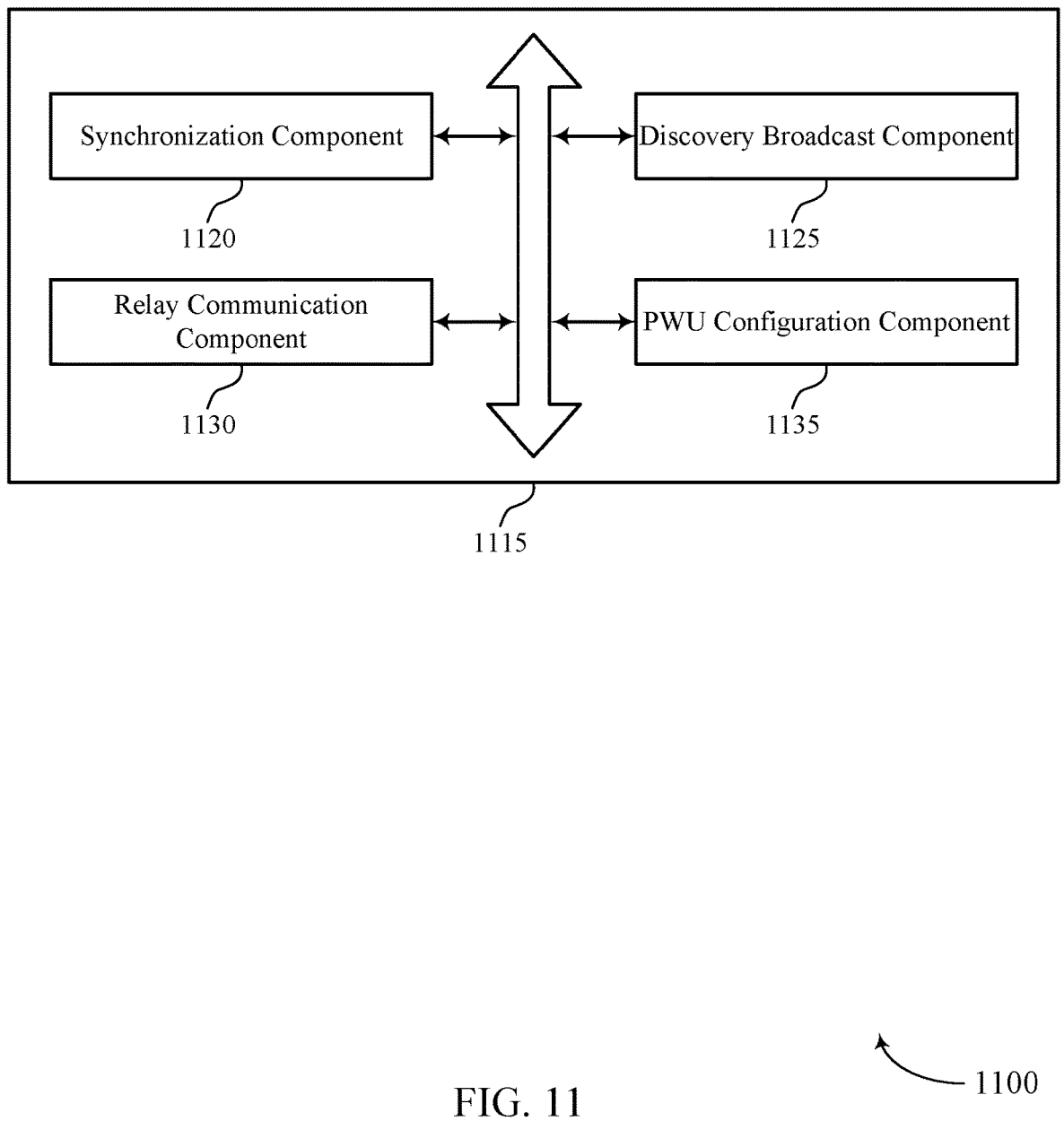

FIG. 11 shows a diagram 1100 of a base station mesh network communications manager 1115 that supports energy efficient discovery and traffic management in a mesh WAN for IoEs with a wakeup receiver in accordance with various aspects of the present disclosure. The base station mesh network communications manager 1115 may be an example of aspects of a base station mesh network communications manager 915, 1015, or 1215 as described with reference to FIGS. 9, 10, and 12. The base station mesh network communications manager 1115 may include synchronization component 1120, discovery broadcast component 1125, relay communication component 1130, and PWU configuration component 1135. Each of these modules may communicate, directly or indirectly, with one another (e.g., via one or more buses).

Synchronization component 1120 may transmit a synchronization signal to a relay device during a PWU period of the relay device, where the PWU period is based on a periodic wakeup configuration. In some cases, the periodic wakeup configuration supports a mesh network of low power devices.

Discovery broadcast component 1125 may receive a discovery broadcast during a discovery period of the periodic wakeup configuration based on the synchronization signal. Relay communication component 1130 may communicate with the relay device based on the discovery broadcast. PWU configuration component 1135 may transmit a PWU configuration signal to the relay device, where the PWU configuration signal includes an identifier, a wakeup cycle, or both, and where the discovery broadcast is received based on the PWU configuration signal.

Figure 12:
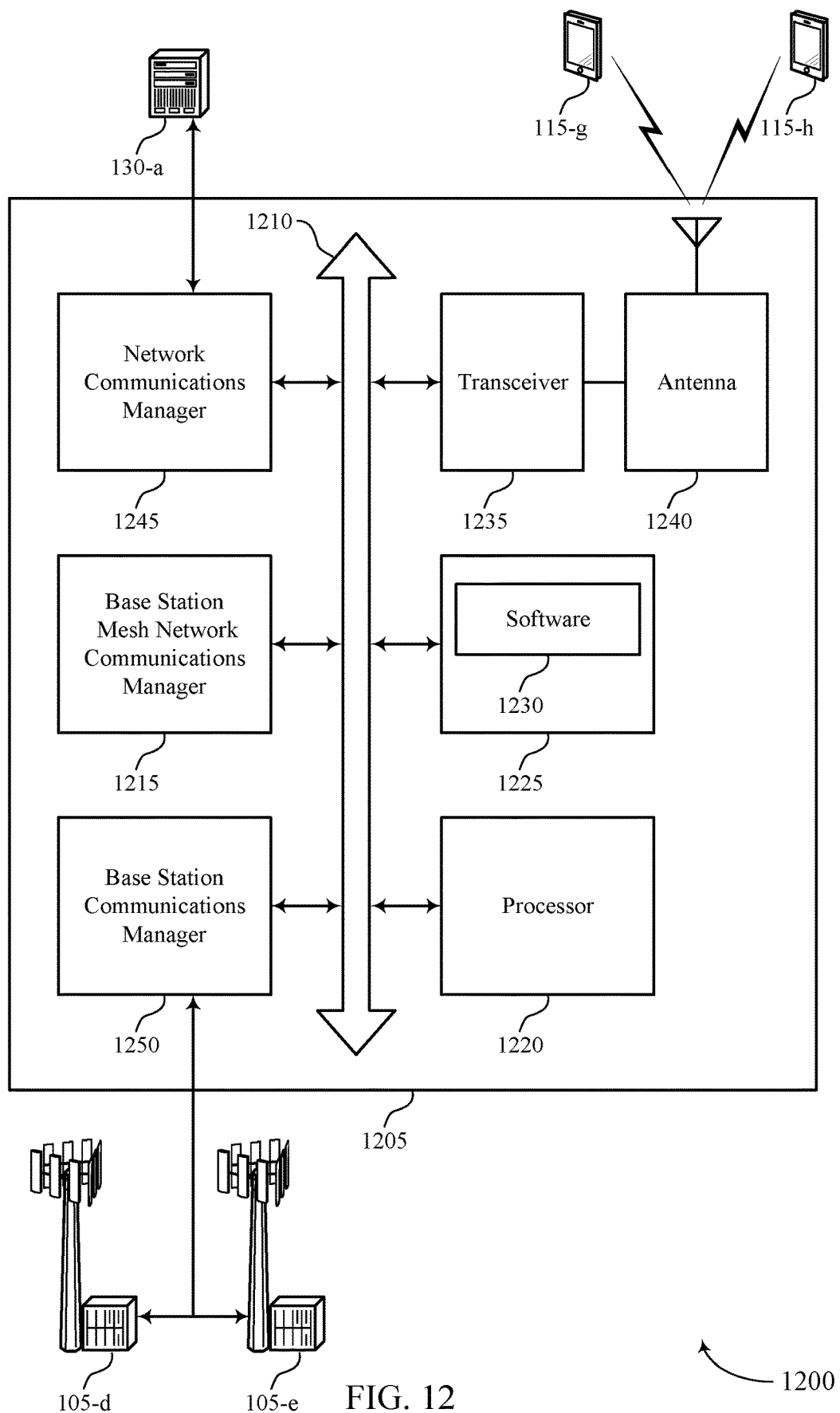
FIG. 12 illustrates a diagram of a system including a base station that supports energy efficient discovery and traffic management in a mesh WAN for IoEs with a wakeup receiver in accordance with various aspects of the present disclosure.

FIG. 12 shows a diagram of a system 1200 including a device 1205 that supports energy efficient discovery and traffic management in a mesh WAN for IoEs with a wakeup receiver in accordance with various aspects of the present disclosure. Device 1205 may be an example of or include the components of a wireless device 905, wireless device 1005, or a base station 105 as described above, e.g., with reference to FIGS. 1, 2, 9, and 10. Device 1205 may include components for bi-directional voice and data communications including components for transmitting and receiving communications, including base station mesh network communications manager 1215, processor 1220, memory 1225, software 1230, transceiver 1235, antenna 1240, network communications manager 1245, and base station communications manager 1250. These components may be in electronic communication via one or more buses (e.g., bus 1210). Device 1205 may communicate wirelessly with one or more UEs 115 (e.g., UE 115-g and UE 115-h).

Processor 1220 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in memory 1225 to perform various functions (e.g., functions or tasks supporting energy efficient discovery and traffic management in a mesh WAN for IoEs with a wakeup receiver).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support energy efficient discovery and traffic management in a mesh WAN for IoEs with a wakeup receiver. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some cases, the device 1205 may include a single antenna 1240. However, in some cases the device 1205 may have more than one antenna 1240, which may be capable of concurrently transmitting or receiving multiple wireless transmissions (e.g., with UE 115-g and UE 115-h).

Network communications manager 1245 may manage communications with a core network 130 (e.g., core network 130-a). In some cases, the communications may be via one or more wired backhaul links. For example, the network communications manager 1245 may manage the transfer of data communications for client devices, such as one or more UEs 115.

Base station communications manager 1250 may manage communications with other base stations 105 (e.g., base station 105-d and base station 105-e), and may include a controller or scheduler for controlling communications with UEs 115 in cooperation with other base stations 105. For example, the base station communications manager 1250 may coordinate scheduling for transmissions to UEs 115 for various interference mitigation techniques such as beamforming or joint transmission. In some examples, base station communications manager 1250 may provide an X2 interface within an LTE/LTE-A wireless communication network technology to provide communication between base stations 105.

Figure 13:
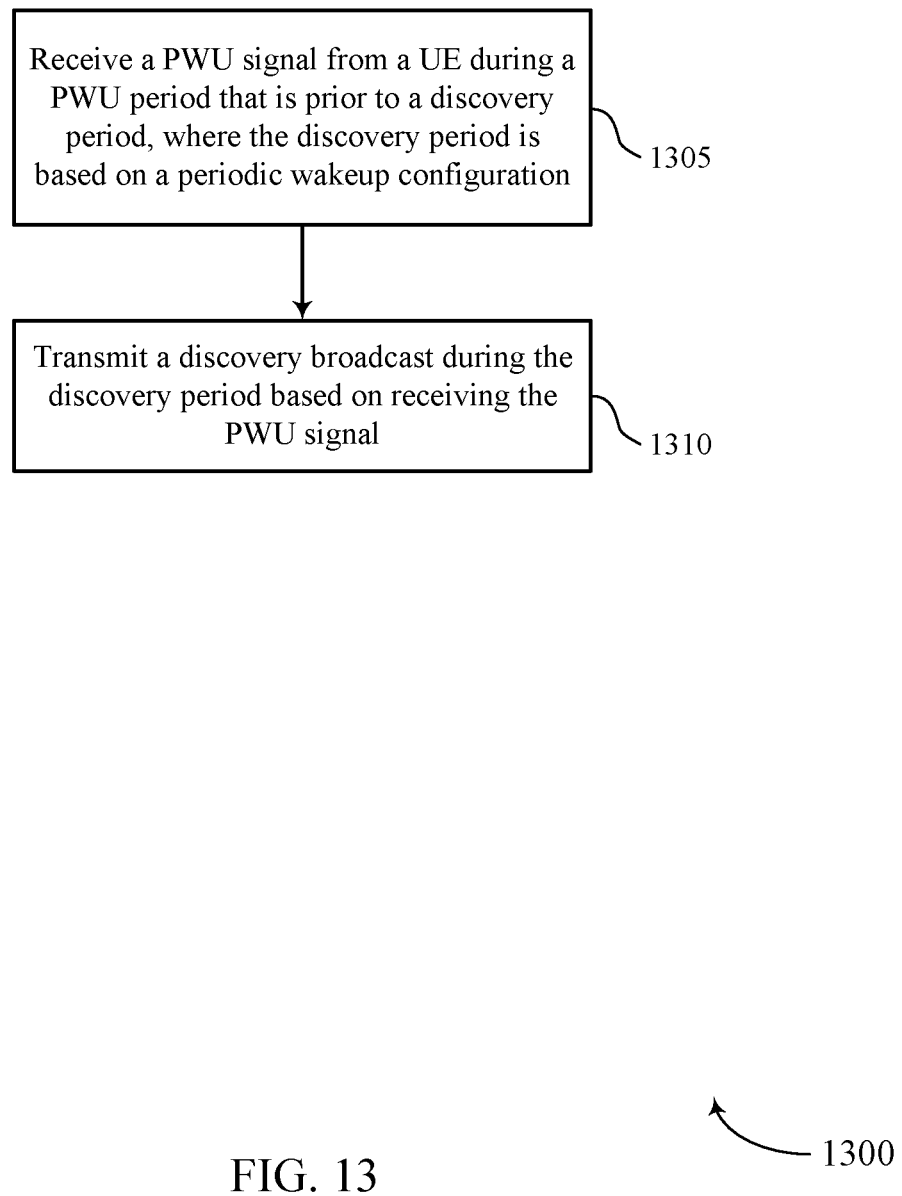
FIGS. 13 through 19 illustrate methods for energy efficient discovery and traffic management in a mesh WAN for IoEs with a wakeup receiver in accordance with various aspects of the present disclosure.

FIG. 13 shows a flowchart illustrating a method 1300 for energy efficient discovery and traffic management in a mesh WAN for IoEs with a wakeup receiver in accordance with various aspects of the present disclosure. The operations of method 1300 may be implemented by a UE 115 or its components as described herein. For example, the operations of method 1300 may be performed by a UE mesh network communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may receive a PWU signal from a different UE 115 during a PWU period that is prior to a discovery period, wherein the discovery period is based at least in part on a periodic wakeup configuration. The operations of block 1305 may be performed according to the methods described with reference to FIGS. 1 through 4. In certain examples, aspects of the operations of block 1305 may be performed by a PWU component as described with reference to FIGS. 5 through 8.

At block 1310 the UE 115 may transmit a discovery broadcast during the discovery period based at least in part on receiving the PWU signal. The operations of block 1310 may be performed according to the methods described with reference to FIGS. 1 through 4. In certain examples, aspects of the operations of block 1310 may be performed by a discovery broadcast component as described with reference to FIGS. 5 through 8.

Figure 14:
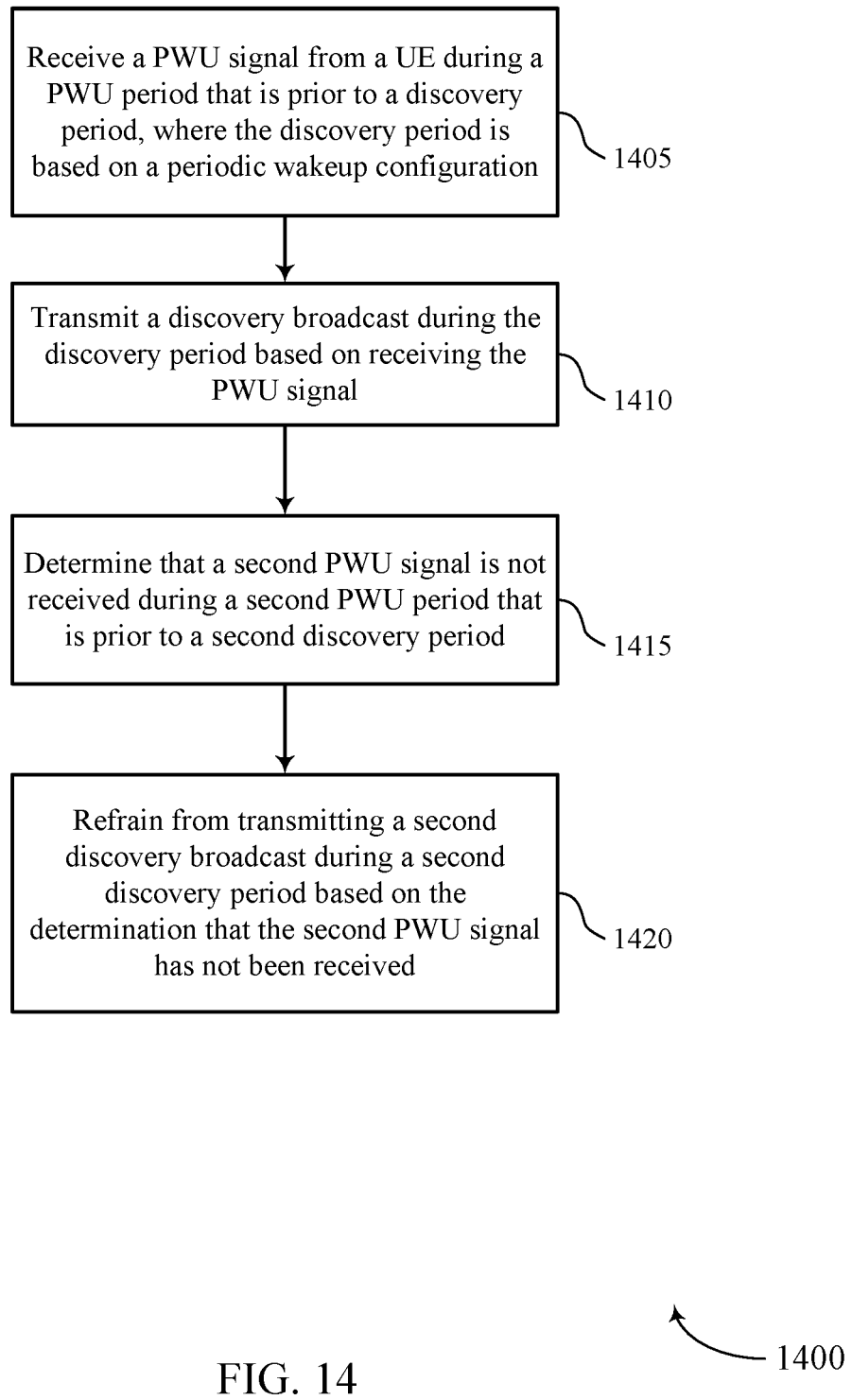

FIG. 14 shows a flowchart illustrating a method 1400 for energy efficient discovery and traffic management in a mesh WAN for IoEs with a wakeup receiver in accordance with various aspects of the present disclosure. The operations of method 1400 may be implemented by a relay device (described herein as a UE 115) or its components as described herein. For example, the operations of method 1400 may be performed by a UE mesh network communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may receive a PWU signal from a different UE 115 during a PWU period that is prior to a discovery period, wherein the discovery period is based at least in part on a periodic wakeup configuration. The operations of block 1405 may be performed according to the methods described with reference to FIGS. 1 through 4. In certain examples, aspects of the operations of block 1405 may be performed by a PWU component as described with reference to FIGS. 5 through 8.

At block 1410 the UE 115 may transmit a discovery broadcast during the discovery period based at least in part on receiving the PWU signal. The operations of block 1410 may be performed according to the methods described with reference to FIGS. 1 through 4. In certain examples, aspects of the operations of block 1410 may be performed by a discovery broadcast component as described with reference to FIGS. 5 through 8.

At block 1415 the UE 115 may determine that a second PWU signal is not received during a second PWU period that is prior to a second discovery period. The operations of block 1415 may be performed according to the methods described with reference to FIGS. 1 through 4. In certain examples, aspects of the operations of block 1415 may be performed by a PWU component as described with reference to FIGS. 5 through 8.

At block 1420 the UE 115 may refrain from transmitting a second discovery broadcast during a second discovery period based at least in part on the determination that the second PWU signal has not been received. The operations of block 1420 may be performed according to the methods described with reference to FIGS. 1 through 4. In certain examples, aspects of the operations of block 1420 may be performed by a discovery broadcast component as described with reference to FIGS. 5 through 8.

Figure 15:
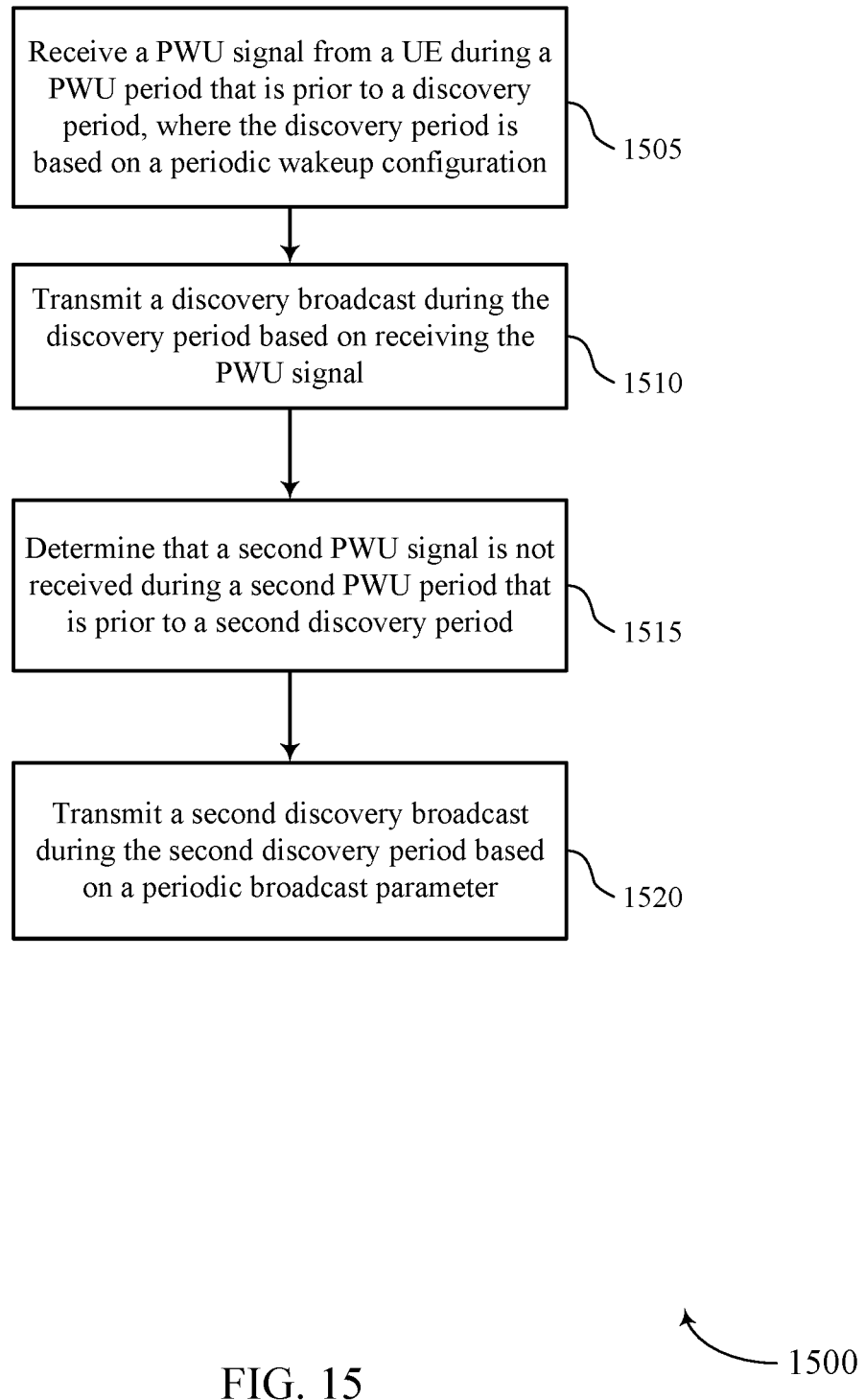

FIG. 15 shows a flowchart illustrating a method 1500 for energy efficient discovery and traffic management in a mesh WAN for IoEs with a wakeup receiver in accordance with various aspects of the present disclosure. The operations of method 1500 may be implemented by a UE 115 or its components as described herein. For example, the operations of method 1500 may be performed by a UE mesh network communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive a PWU signal from a different UE 115 during a PWU period that is prior to a discovery period, wherein the discovery period is based at least in part on a periodic wakeup configuration. The operations of block 1505 may be performed according to the methods described with reference to FIGS. 1 through 4. In certain examples, aspects of the operations of block 1505 may be performed by a PWU component as described with reference to FIGS. 5 through 8.

At block 1510 the UE 115 may transmit a discovery broadcast during the discovery period based at least in part on receiving the PWU signal. The operations of block 1510 may be performed according to the methods described with reference to FIGS. 1 through 4. In certain examples, aspects of the operations of block 1510 may be performed by a discovery broadcast component as described with reference to FIGS. 5 through 8.

At block 1515 the UE 115 may determine that a second PWU signal is not received during a second PWU period that is prior to a second discovery period. The operations of block 1515 may be performed according to the methods described with reference to FIGS. 1 through 4. In certain examples, aspects of the operations of block 1515 may be performed by a PWU component as described with reference to FIGS. 5 through 8.

At block 1520 the UE 115 may transmit a second discovery broadcast during the second discovery period based at least in part on a periodic broadcast parameter. The operations of block 1520 may be performed according to the methods described with reference to FIGS. 1 through 4. In certain examples, aspects of the operations of block 1520 may be performed by a discovery broadcast component as described with reference to FIGS. 5 through 8.

Figure 16:
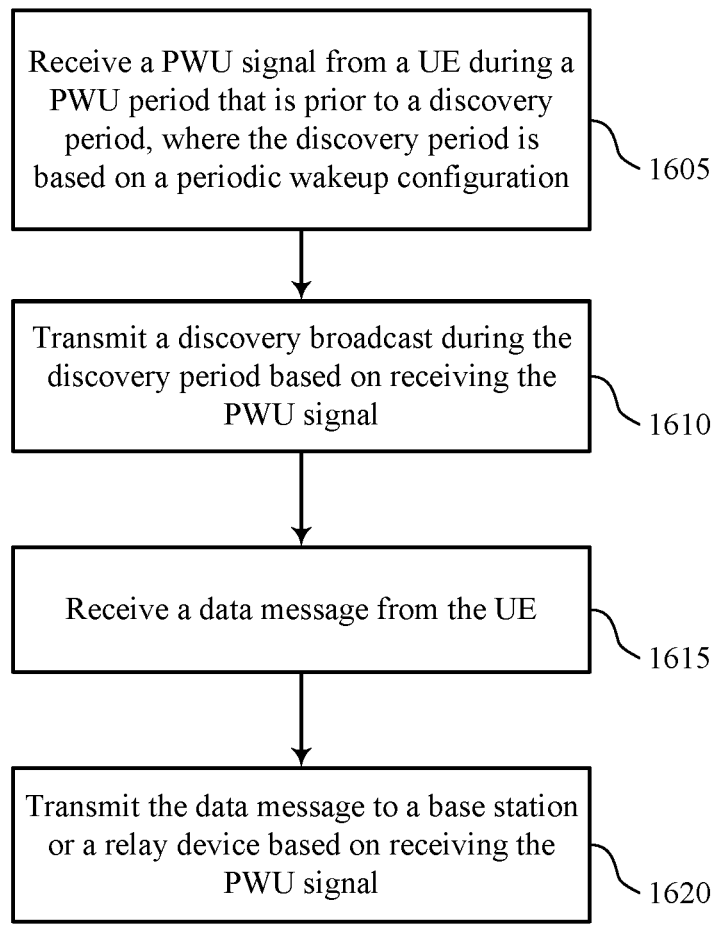

FIG. 16 shows a flowchart illustrating a method 1600 for energy efficient discovery and traffic management in a mesh WAN for IoEs with a wakeup receiver in accordance with various aspects of the present disclosure. The operations of method 1600 may be implemented by a UE 115 or its components as described herein. For example, the operations of method 1600 may be performed by a UE mesh network communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive a PWU signal from a different UE 115 during a PWU period that is prior to a discovery period, wherein the discovery period is based at least in part on a periodic wakeup configuration. The operations of block 1605 may be performed according to the methods described with reference to FIGS. 1 through 4. In certain examples, aspects of the operations of block 1605 may be performed by a PWU component as described with reference to FIGS. 5 through 8.

At block 1610 the UE 115 may transmit a discovery broadcast during the discovery period based at least in part on receiving the PWU signal. The operations of block 1610 may be performed according to the methods described with reference to FIGS. 1 through 4. In certain examples, aspects of the operations of block 1610 may be performed by a discovery broadcast component as described with reference to FIGS. 5 through 8.

At block 1615 the UE 115 may receive a data message from the different UE 115. The operations of block 1615 may be performed according to the methods described with reference to FIGS. 1 through 4. In certain examples, aspects of the operations of block 1615 may be performed by a receiver as described with reference to FIGS. 5 through 8.

At block 1620 the UE 115 may transmit the data message to a base station 105 or a relay device based at least in part on receiving the PWU signal. The operations of block 1620 may be performed according to the methods described with reference to FIGS. 1 through 4. In certain examples, aspects of the operations of block 1620 may be performed by a relay component as described with reference to FIGS. 5 through 8.

Figure 17:
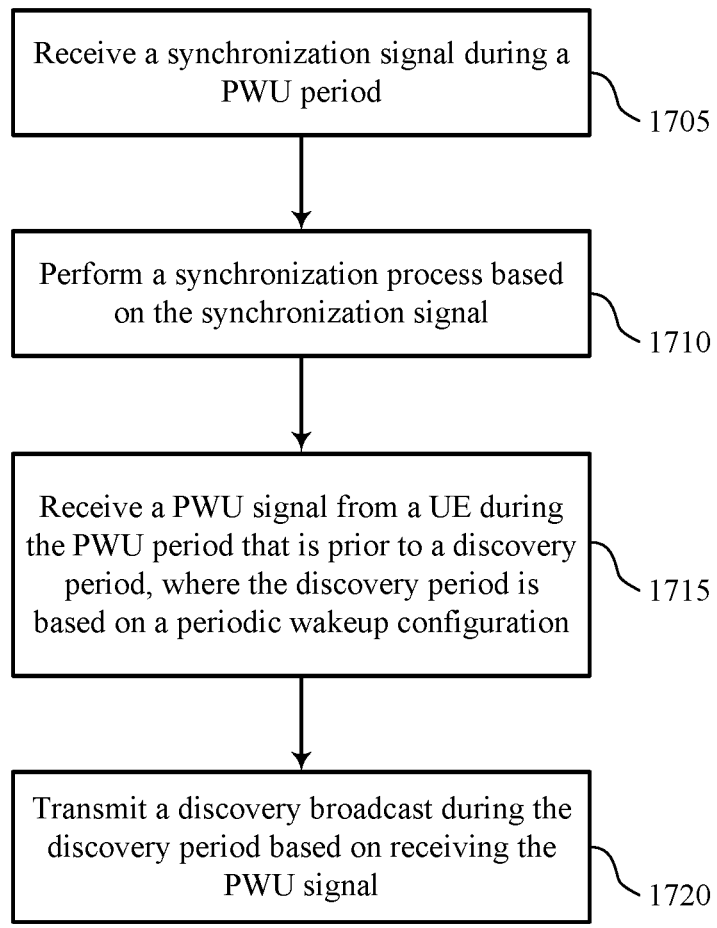

FIG. 17 shows a flowchart illustrating a method 1700 for energy efficient discovery and traffic management in a mesh WAN for IoEs with a wakeup receiver in accordance with various aspects of the present disclosure. The operations of method 1700 may be implemented by a UE 115 or its components as described herein. For example, the operations of method 1700 may be performed by a UE mesh network communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive a synchronization signal during a PWU period that is prior to a discovery period, wherein the discovery period is based at least in part on a periodic wakeup configuration. The operations of block 1705 may be performed according to the methods described with reference to FIGS. 1 through 4. In certain examples, aspects of the operations of block 1705 may be performed by a synchronization component as described with reference to FIGS. 5 through 8.

At block 1710 the UE 115 may perform a synchronization process based at least in part on the synchronization signal. The operations of block 1710 may be performed according to the methods described with reference to FIGS. 1 through 4. In certain examples, aspects of the operations of block 1710 may be performed by a synchronization component as described with reference to FIGS. 5 through 8.

At block 1715 the UE 115 may receive a PWU signal from a different UE 115 during the PWU period. The operations of block 1715 may be performed according to the methods described with reference to FIGS. 1 through 4. In certain examples, aspects of the operations of block 1715 may be performed by a PWU component as described with reference to FIGS. 5 through 8.

At block 1720 the UE 115 may transmit a discovery broadcast during the discovery period based at least in part on receiving the PWU signal. The operations of block 1720 may be performed according to the methods described with reference to FIGS. 1 through 4. In certain examples, aspects of the operations of block 1720 may be performed by a discovery broadcast component as described with reference to FIGS. 5 through 8.

Figure 18:
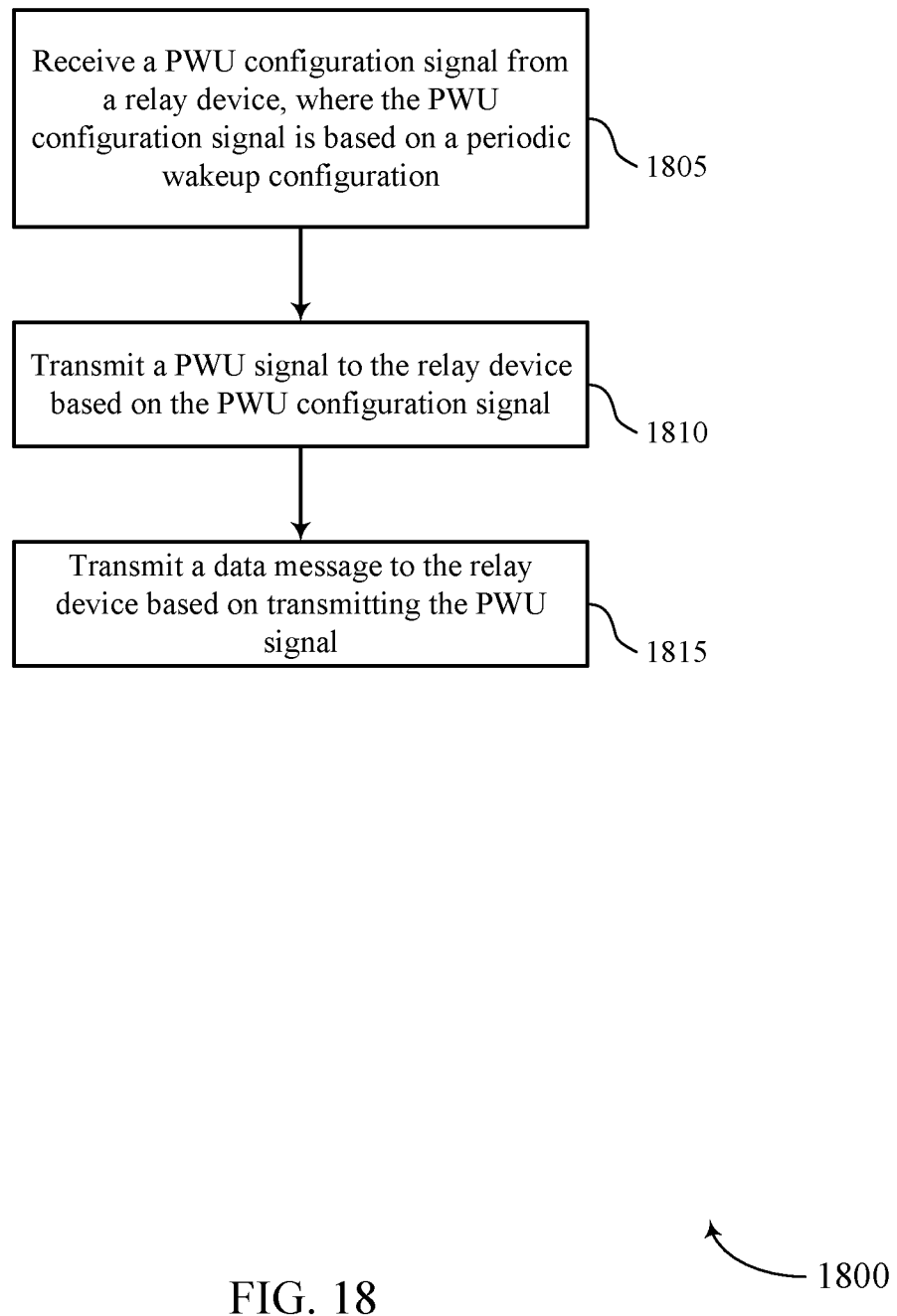

FIG. 18 shows a flowchart illustrating a method 1800 for energy efficient discovery and traffic management in a mesh WAN for IoEs with a wakeup receiver in accordance with various aspects of the present disclosure. The operations of method 1800 may be implemented by a UE 115 or its components as described herein. For example, the operations of method 1800 may be performed by a UE mesh network communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may receive a PWU configuration signal from a relay device (e.g., a different UE 115), wherein the PWU configuration signal is based at least in part on a periodic wakeup configuration. The operations of block 1805 may be performed according to the methods described with reference to FIGS. 1 through 4. In certain examples, aspects of the operations of block 1805 may be performed by a PWU configuration component as described with reference to FIGS. 5 through 8.

At block 1810 the UE 115 may transmit a PWU signal to the relay device based at least in part on the PWU configuration signal. The operations of block 1810 may be performed according to the methods described with reference to FIGS. 1 through 4. In certain examples, aspects of the operations of block 1810 may be performed by a PWU component as described with reference to FIGS. 5 through 8.

At block 1815 the UE 115 may transmit a data message to the relay device based at least in part on transmitting the PWU signal. The operations of block 1815 may be performed according to the methods described with reference to FIGS. 1 through 4. In certain examples, aspects of the operations of block 1815 may be performed by a transmitter as described with reference to FIGS. 5 through 8.

Figure 19:
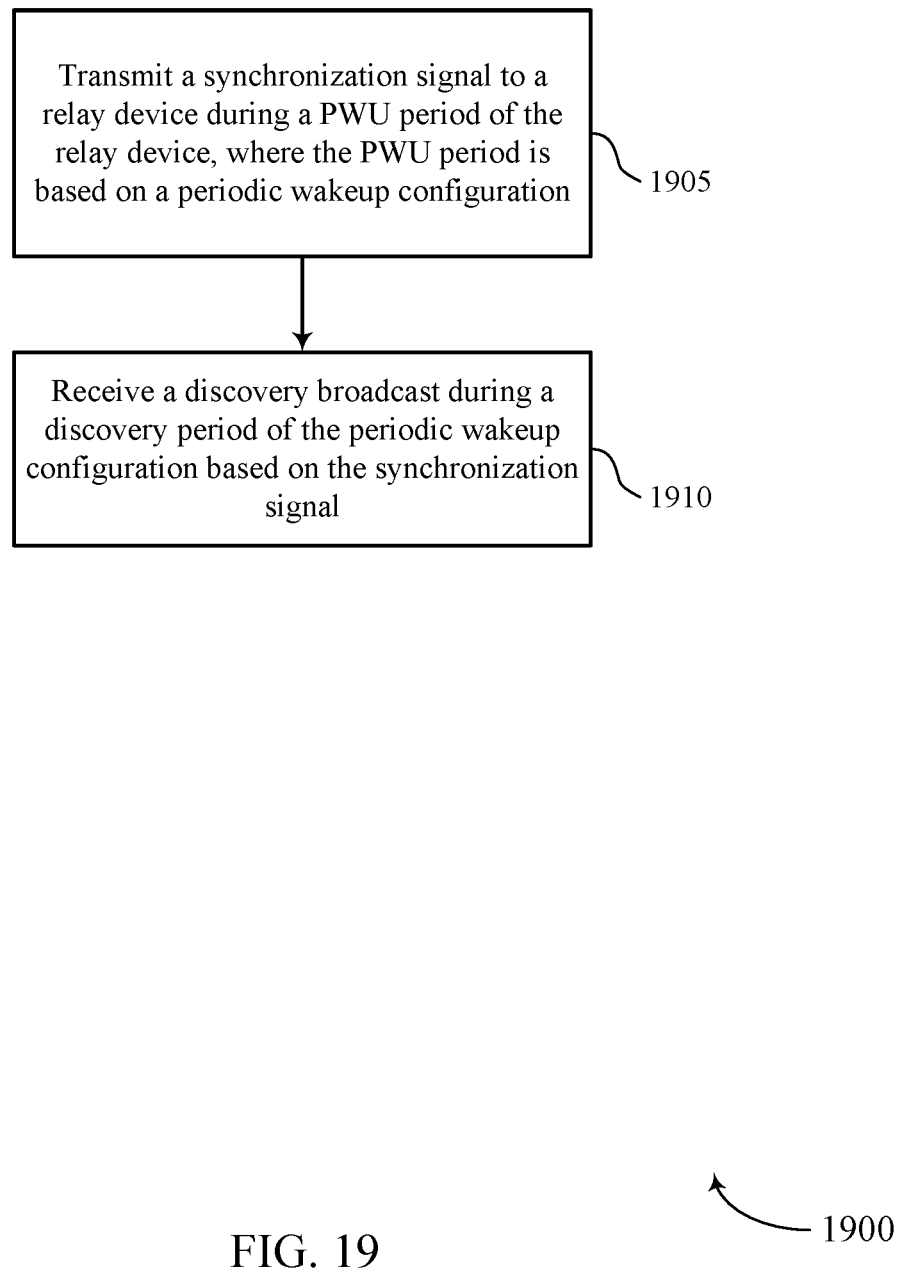

FIG. 19 shows a flowchart illustrating a method 1900 for energy efficient discovery and traffic management in a mesh WAN for IoEs with a wakeup receiver in accordance with various aspects of the present disclosure. The operations of method 1900 may be implemented by a base station 105 or its components as described herein. For example, the operations of method 1900 may be performed by a base station mesh network communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may transmit a synchronization signal to a relay device (e.g., a UE 115) during a PWU period of the relay device, wherein the PWU period is based at least in part on a periodic wakeup configuration. The operations of block 1905 may be performed according to the methods described with reference to FIGS. 1 through 4. In certain examples, aspects of the operations of block 1905 may be performed by a synchronization component as described with reference to FIGS. 9 through 12.

At block 1910 the base station 105 may receive a discovery broadcast during a discovery period of the periodic wakeup configuration based at least in part on the synchronization signal. The operations of block 1910 may be performed according to the methods described with reference to FIGS. 1 through 4. In certain examples, aspects of the operations of block 1910 may be performed by a discovery broadcast component as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term eNB may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, an eNB, a gNB, a Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a relay device, comprising:
    transmitting, by the relay device to a user equipment (UE), a pre-wakeup (PWU) configuration signal that indicates a PWU period for the relay device, wherein the relay device comprises a first receiver and a second receiver having a higher power consumption than the first receiver, and wherein the first receiver and second receiver are deactivated after the PWU configuration signal is transmitted;
    activating, by the relay device, the first receiver for the PWU period;
    receiving, by the relay device from the UE and during the PWU period, a PWU signal using the first receiver;
    activating, by the relay device, the second receiver after the PWU period;
    transmitting, by the relay device to the UE and based at least in part on receiving the PWU signal, a discovery broadcast signal during a discovery period that is after the PWU period; and
    receiving, by the relay device from the UE, a data message using the second receiver.

2. The method of claim 1, further comprising:
    determining that a second PWU signal is not received in during a second PWU period prior to a second discovery period; and
    transmitting a second discovery broadcast signal during the second discovery period based at least in part on a periodic broadcast parameter.

3. The method of claim 1, further comprising:
    transmitting the data message to a base station or a second relay device.

4. The method of claim 1, further comprising:
    receiving, by the relay device from the UE, a synchronization signal prior to the discovery period; and
    performing a synchronization process based at least in part on the synchronization signal.

5. The method of claim 1, wherein:
    receiving the PWU signal comprises receiving synchronization information, the method further comprising:
    performing a synchronization process based at least in part on the synchronization information.

6. The method of claim 1, wherein:
    the PWU signal comprises an identifier; and
    the discovery broadcast signal or the data message is based at least in part on the identifier.

7. The method of claim 6, wherein:
    the identifier comprises a device-specific identifier, a cell-specific identifier, or a combination thereof.

8. The method of claim 1, wherein the PWU configuration signal comprises an identifier, a wakeup cycle, or both, and wherein the PWU signal is received based at least in part on the PWU configuration signal.

9. The method of claim 1, wherein:
the PWU signal comprises a single tone beacon.

10. The method of claim 9, wherein:
the PWU signal is received based at least in part on a hopping pattern associated with a cell or the relay device.

11. The method of claim 1, wherein:
a periodic wakeup configuration for the relay device supports a mesh network of low power devices.

12. The method of claim 1, further comprising:
determining that a second PWU signal is not received during a second PWU period that is prior to a second discovery period; and
refraining from transmitting a second discovery broadcast signal during the second discovery period based at least in part on the determination that the second PWU signal is not received during the second PWU period.

13. The method of claim 12, further comprising:
refraining from powering up one or more radio components during the second discovery period based at least in part on the determination that the second PWU signal has not been received.

14. A method for wireless communication at a user equipment (UE), comprising:
receiving, by the UE from a relay device, a pre-wakeup (PWU) configuration signal that indicates a PWU period for the relay device;
transmitting, by the UE to the relay device and during the PWU period, a PWU signal that indicates a number of subframes between the PWU period and a discovery period for the relay device; and
transmitting, by the UE to the relay device, a data message.

15. The method of claim 14, wherein:
the PWU configuration signal comprises an identifier, a wakeup cycle, or both.

16. The method of claim 14, wherein:
transmitting the PWU signal comprises transmitting synchronization information to the relay device.

17. A method for wireless communication at a user equipment (UE), comprising:
receiving, by the UE from a relay device, a pre-wakeup (PWU) configuration signal that indicates a PWU period for the relay device;
transmitting, by the UE to the relay device, a synchronization signal during the PWU period, wherein the synchronization signal comprises timing synchronization information for the relay device to transmit a discovery broadcast signal during a subsequent discovery period, wherein the timing synchronization information indicates a number of subframes between the PWU period and the subsequent discovery period for the relay device; and
receiving, by the UE from the relay device, the discovery broadcast signal during the subsequent discovery period from the relay device based at least in part on the synchronization signal.

18. The method of claim 17, further comprising:
communicating with the relay device based at least in part on the discovery broadcast signal.

19. The method of claim 17, wherein the PWU configuration signal comprises an identifier, a wakeup cycle, or both, and wherein the synchronization signal is transmitted based at least in part on the PWU configuration signal.

20. The method of claim 17, further comprising:
identifying, by the UE and based at least in part on the PWU configuration signal, a periodic wakeup configuration for the relay device.

21. An apparatus for wireless communication at a relay device, comprising:
a processor;
memory in electronic communication with the processor; and
instructions stored in the memory and operable, when executed by the processor, to cause the apparatus to:
transmit, to a user equipment (UE), a pre-wakeup (PWU) configuration signal that indicates a PWU period for the relay device, wherein the relay device comprises a first receiver and a second receiver having a higher power consumption than the first receiver, and wherein the first receiver and second receiver are operable to be deactivated after the PWU configuration signal is transmitted;
activate the first receiver for the PWU period;
receive, from the UE and during the PWU period, a PWU signal using the first receiver;
activate, the second receiver after the PWU period;
transmit, to the UE and based at least in part on the PWU signal, a discovery broadcast signal during a discovery period that is after the PWU period; and
receive, from the UE, a data message using the second receiver.

22. The apparatus of claim 21, wherein the instructions are further executable by the processor to cause the apparatus to:
determine that a second PWU signal is not received during a second PWU period prior to a second discovery period; and
transmit a second discovery broadcast signal during the second discovery period based at least in part on a periodic broadcast parameter.

23. The apparatus of claim 21, wherein the instructions are further executable by the processor to cause the apparatus to:
transmit the data message to a base station or a second relay device.

24. The apparatus of claim 21, wherein the instructions are further executable by the processor to cause the apparatus to:
receive, from the UE, a synchronization signal prior to the discovery period; and
perform a synchronization process based at least in part on the synchronization signal.

25. The apparatus of claim 21, wherein:
the PWU signal comprises an identifier; and
the discovery broadcast signal or the data message is based at least in part on the identifier.

26. The apparatus of claim 21, wherein:
the PWU configuration signal comprises an identifier, a wakeup cycle, or both.

27. The apparatus of claim 21, wherein:
the PWU signal comprises a single tone beacon.

28. The apparatus of claim 21, wherein the instructions are further executable by the processor to cause the apparatus to:
determine that a second PWU signal is not received during a second PWU period that is prior to a second discovery period; and refrain from transmitting a second discovery broadcast signal during the second discovery period based at least in part on the determination that the second PWU signal is not received during the second PWU period.

29. The apparatus of claim 28, wherein the instructions are further executable by the processor to cause the apparatus to:
refrain from powering up one or more radio components during the second discovery period based at least in part on the determination that the second PWU signal has not been received.

30. An apparatus for wireless communication at a user equipment (UE), comprising:
a processor;
memory in electronic communication with the processor; and
instructions stored in the memory and operable, when executed by the processor, to cause the apparatus to:
receive, from a relay device, a pre-wakeup (PWU) configuration signal that indicates a PWU period for the relay device;
transmit, to the relay device and during the PWU period, a PWU signal that indicates a number of subframes between the PWU period and a discovery period for the relay device; and
transmit, to the relay device, a data message.

31. The apparatus of claim 30, wherein:
the PWU configuration signal comprises an identifier, a wakeup cycle, or both.

32. The apparatus of claim 30, wherein:
the PWU signal comprises synchronization information for the relay device.

33. An apparatus for wireless communication at a user equipment (UE), comprising:
a processor;
memory in electronic communication with the processor; and instructions stored in the memory and operable, when executed by the processor, to cause the apparatus to:
receive, from a relay device, a pre-wakeup (PWU) configuration signal that indicates a PWU period for the relay device;
transmit by the UE to the relay device, a synchronization signal during the PWU period, wherein the synchronization signal comprises timing synchronization information for the relay device to transmit a discovery broadcast signal during a subsequent discovery period, wherein the timing synchronization information indicates a number of subframes between the PWU period and the subsequent discovery period for the relay device; and
receive, by the UE from the relay device, the discovery broadcast signal during the subsequent discovery period from the relay device based at least in part on the synchronization signal.

34. The apparatus of claim 33, wherein the instructions are further executable by the processor to cause the apparatus to:
communicate with the relay device based at least in part on the discovery broadcast signal.

35. The apparatus of claim 33, wherein:
the PWU configuration signal comprises an identifier, a wakeup cycle, or both.

36. The apparatus of claim 33, wherein the instructions are further executable by the processor to cause the apparatus to:
identify, based at least in part on the PWU configuration signal, a periodic wakeup configuration for the relay device.

37. An apparatus for wireless communication at a relay device, comprising:
means for transmitting, to a user equipment (UE), a pre-wakeup (PWU) configuration signal that indicates a PWU period for the relay device, wherein the relay device comprises a first receiver and a second receiver having a higher power consumption than the first receiver, and wherein the first receiver and second receiver are operable to be deactivated after the PWU configuration signal is transmitted;
means for activating the first receiver for the PWU period;
means for receiving, from the UE and during the PWU period, a PWU signal using the first receiver;
means for activating, the second receiver after the PWU period;
means for transmitting, to the UE and based at least in part on the PWU signal, a discovery broadcast signal during a discovery period that is after the PWU period; and
means for receiving, from the UE, a data message using the second receiver.

38. A non-transitory computer readable medium storing code for wireless communication at a relay device, the code comprising instructions executable by a processor to:
transmit, to a user equipment (UE), a pre-wakeup (PWU) configuration signal that indicates a PWU period for the relay device, wherein the relay device comprises a first receiver and a second receiver having a higher power consumption than the first receiver, and wherein the first receiver and second receiver are operable to be deactivated after the PWU configuration signal is transmitted;
activate the first receiver for the PWU period;
receive, from the UE and during the PWU period, a PWU signal using the first receiver;
activate, the second receiver after the PWU period;
transmit, to the UE and based at least in part on the PWU signal, a discovery broadcast signal during a discovery period that is after the PWU period; and
receive, from the UE, a data message using the second receiver.

* * * * *